(12) United States Patent
Van Zyl et al.

(10) Patent No.: US 9,758,670 B2
(45) Date of Patent: *Sep. 12, 2017

(54) POLYCARBONATE COMPOSITION

(75) Inventors: Andries J. P. Van Zyl, Bergen Op Zoom (NL); Jian Yang, Shanghai (CN); Robert Dirk Van De Grampel, Tholen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 330 days.

This patent is subject to a terminal disclaimer.

(21) Appl. No.: 14/401,351

(22) PCT Filed: May 16, 2012

(86) PCT No.: PCT/CN2012/075562
§ 371 (c)(1),
(2), (4) Date: Feb. 9, 2015

(87) PCT Pub. No.: WO2013/170452
PCT Pub. Date: Nov. 21, 2013

(65) Prior Publication Data
US 2015/0344687 A1    Dec. 3, 2015

(51) Int. Cl.
| | | |
|---|---|---|
| *C08K 3/18* | (2006.01) | |
| *C08K 3/40* | (2006.01) | |
| *C08L 67/00* | (2006.01) | |
| *C08L 69/00* | (2006.01) | |
| *C08L 83/10* | (2006.01) | |
| *C08K 3/22* | (2006.01) | |
| *C08G 77/448* | (2006.01) | |

(52) U.S. Cl.
CPC ............ *C08L 69/005* (2013.01); *C08L 83/10* (2013.01); *C08G 77/448* (2013.01); *C08K 2003/2241* (2013.01); *C08L 2203/20* (2013.01); *C08L 2205/025* (2013.01); *C08L 2205/03* (2013.01)

(58) Field of Classification Search
USPC ........................................ 524/431, 494, 537
See application file for complete search history.

(56) References Cited

U.S. PATENT DOCUMENTS

| 4,027,072 A | 5/1977 | Molari, Jr. |
|---|---|---|
| 4,487,896 A | 12/1984 | Mark et al. |
| 5,360,861 A | 11/1994 | Campbell |
| 6,399,737 B1 | 6/2002 | Elkovitch |
| 7,119,140 B2 | 10/2006 | Basham et al. |
| 9,169,391 B2* | 10/2015 | Yang ................. C08L 69/005 |
| 2002/0099128 A1* | 7/2002 | Patel ........................ H01B 1/24 524/494 |
| 2006/0002814 A1 | 1/2006 | Chatterjee et al. |
| 2007/0105994 A1 | 5/2007 | Li et al. |
| 2008/0119596 A1 | 5/2008 | Agarwal et al. |
| 2008/0230751 A1 | 9/2008 | Li et al. |
| 2010/0129649 A1 | 5/2010 | Malinoski et al. |
| 2012/0184662 A1 | 7/2012 | Van Der Mee et al. |
| 2013/0309474 A1 | 11/2013 | Peek et al. |
| 2015/0079375 A1 | 3/2015 | Yang et al. |

FOREIGN PATENT DOCUMENTS

| EP | 0465923 A2 | 1/1992 |
|---|---|---|
| WO | 0245098 A2 | 6/2002 |
| WO | 2010006226 A1 | 1/2010 |
| WO | 2012160540 A1 | 11/2012 |

OTHER PUBLICATIONS

English abstract of JP 2006010918 A, Jan. 12, 2006, 6 pages, Japan.*
English abstract of JP 2006249289 A, Sep. 21, 2006, 5 pages, Japan.*
International Preliminary Report on Patentability for International Application No. PCT/CN2012/075562, Application Filing Date May 16, 2012, dated Nov. 27, 2014, 7 pages.
International Search Report and Written Opinion for International Application No. PCT/CN2012/075562, Application Filing Date May 16, 2012, dated Feb. 28, 2013, 13 pages.

* cited by examiner

*Primary Examiner* — Tae H Yoon
(74) *Attorney, Agent, or Firm* — Cantor Colburn LLP

(57) ABSTRACT

A composition includes at least one poly(aliphatic ester)-polycarbonate copolymer, a polysiloxane-polycarbonate copolymer, non-bonding glass fibers, and titanium dioxide. The composition exhibits excellent impact properties and an ultra-white color.

40 Claims, No Drawings

POLYCARBONATE COMPOSITION

CROSS REFERENCE TO RELATED APPLICATIONS

This application claims priority to and is a national stage application of PCT/CN2012/075562, filed on May 16, 2012, which is hereby incorporated by reference in its entirety.

BACKGROUND

The present disclosure relates generally to polycarbonate compositions that have good flow properties, high impact properties, and good aesthetic values with ultrawhite colors. Also disclosed herein are methods for preparing and/or using the same.

Polycarbonates (PC) are synthetic engineering thermoplastic resins derived from bisphenols and phosgene, or their derivatives. They are linear polyesters of carbonic acid and can be formed from dihydroxy compounds and carbonate diesters or carbonyl halides, or by ester interchange. Polycarbonates are a useful class of polymers having many beneficial properties.

The consumer electronics market has grown significantly in recent years. Recent designs aim for slimness, with thinner walls and with wide and large display panels. Known compositions used for such mobile devices (e.g. mobile phones) may exhibit brittleness and/or cracking, unsightly surfaces, and/or poor flowability.

Due to various "critical to quality" requirements of customers, there is a need for polycarbonate compositions that have good flow properties, aesthetic properties, and impact properties combined with stiffness.

BRIEF DESCRIPTION

Disclosed herein are various compositions that exhibit good flow, aesthetic, impact properties, and ultra-white color. The compositions generally include at least one poly(aliphatic ester)-polycarbonate copolymer, a polysiloxane-polycarbonate copolymer, non-bonding glass fibers, and titanium dioxide.

Disclosed in various embodiments is a composition comprising: a first poly(aliphatic ester)-polycarbonate copolymer having a weight average molecular weight of from about 15,000 to about 40,000; a polysiloxane-polycarbonate copolymer; non-bonding glass fibers; and titanium dioxide; wherein the composition exhibits a notched Izod impact strength measured according to ASTM D256 of at least 90 J/m; a ductility measured according to ASTM D256 of at least 20%; and a L* measured according to CIELAB of at least 90.

The aliphatic ester may be derived from an aliphatic dicarboxylic acid that has a total of from 8 to 12 carbon atoms, such as sebacic acid.

The composition may comprise up to about 75 wt % of the first poly(aliphatic ester)-polycarbonate copolymer.

The composition may further comprise a second poly(aliphatic ester)-polycarbonate copolymer, wherein a weight average molecular weight of the second poly(aliphatic ester)-polycarbonate copolymer is less than the weight average molecular weight of the first poly(aliphatic ester)-polycarbonate copolymer. The weight ratio of the second poly(aliphatic ester)-polycarbonate copolymer to the first poly(aliphatic ester)-polycarbonate copolymer may be from about 1:4 to about 5:2. The first poly(aliphatic ester)-polycarbonate copolymer should have a weight average molecular weight of from about 30,000 to about 40,000 and the second poly(aliphatic ester)-polycarbonate copolymer should have a weight average molecular weight of from about 15,000 to about 25,000. The composition may comprise from about 20 to about 40 wt % of the first poly(aliphatic ester)-polycarbonate copolymer, and/or from about 15 to about 55 wt % of the second poly(aliphatic ester)-polycarbonate copolymer.

The composition may comprise from about 5 to about 25 wt % of the polysiloxane-polycarbonate copolymer. The composition may comprise from about 5 to about 35 wt % of the glass fibers.

The composition may comprise from greater than 0 to about 15 wt % of the titanium dioxide. The titanium dioxide can be coated with an inorganic or organic coating. The titanium dioxide can have an average particle size of from about 30 nm to about 500 nm.

In some embodiments, the composition exhibits an L* measured according to CIELAB of at least 95.

In some embodiments, the composition exhibits a notched Izod impact strength measured according to ASTM D256 of at least 90 J/m; a ductility measured according to ASTM D256 of at least 20%; a L* measured according to CIELAB of at least 90; and a gloss measured according to ASTM D2457 (at 60°) of at least 40. In additional embodiments, the composition exhibits a notched Izod impact strength measured according to ASTM D256 of at least 90 J/m; a ductility measured according to ASTM D256 of at least 20%; a L* measured according to CIELAB of at least 90; and a gloss measured according to ASTM D2457 (at 60°) of at least 80.

In others, the composition exhibits a notched Izod impact strength measured according to ASTM D256 of at least 90 J/m; a ductility measured according to ASTM D256 of at least 20%; a L* measured according to CIELAB of at least 90; a melt flow rate measured according to ASTM D 1238 (300° C., 1.2 kg, 6 minutes) of at least 3 g/10 min; and a flexural modulus measured according to ISO 178 of at least 3000 MPa.

In additional embodiments, the composition exhibits a notched Izod impact strength measured according to ASTM D256 of at least 150 J/m; a ductility measured according to ASTM D256 of at least 20%; and a L* measured according to CIELAB of at least 90.

In yet other embodiments, the composition exhibits a notched Izod impact strength measured according to ASTM D256 of from at least 200 J/m to about 350 J/m; a ductility measured according to ASTM D256 of at least 20%; and a L* measured according to CIELAB of at least 90.

In yet other embodiments, the composition exhibits a notched Izod impact strength measured according to ASTM D256 of at least 90 J/m; a ductility measured according to ASTM D256 of at least 20%; a L* measured according to CIELAB of at least 90; and a flexural modulus measured according to ISO 178 of from at least 3000 MPa to about 6000 MPa.

In still other embodiments, the composition contains at least 10 wt % of titanium dioxide; exhibits a notched Izod impact strength measured according to ASTM D256 of at least 200 J/m; a ductility measured according to ASTM D256 of at least 20%; and exhibits a L* measured according to CIELAB of at least 95.

In other desirable embodiments, the composition exhibits a notched Izod impact strength measured according to ASTM D256 of at least 90 J/m; a ductility measured according to ASTM D256 of at least 80%; and a L* measured according to CIELAB of at least 90.

Sometimes, the composition contains from about 5 to about 15 wt % of titanium dioxide and exhibits a notched Izod impact strength measured according to ASTM D256 of at least 90 J/m; a ductility measured according to ASTM D256 of at least 80%; and a L* measured according to CIELAB of at least 90.

Sometimes, the composition has a ductility of 100%, and in addition also exhibits a gloss measured according to ASTM D2457 (at 60°) of at least 40 or at least 80.

The first poly(aliphatic ester)-polycarbonate copolymer may contain from about 2 to about 13 mol % of aliphatic ester units. The first poly(aliphatic ester)-polycarbonate copolymer may contain from about 87 to about 98 mol % of carbonate units derived from bisphenol-A. The aliphatic ester units may be derived from sebacic acid.

Sometimes, a siloxane block chain length of the polysiloxane-polycarbonate copolymer is from about 30 to about 100, such as from about 35 to about 55. The polysiloxane-polycarbonate copolymer may have a siloxane block content of from about 15 wt % to about 25 wt %, or from greater than 6 wt % to about 22 wt %. Alternatively, the composition may have a total softblock content of less than 3.5 wt %. In other embodiments, the composition comprises from about 0.5 wt % to about 6 wt % of siloxane originating from the polysiloxane-polycarbonate copolymer.

Titanium dioxide is present as a white pigment. In embodiments, the composition does not contain other white pigments like zinc sulfide or calcium carbonate. Similarly, in various embodiments, the composition does not contain milled fibers, bonding glass fibers, or flat glass fibers.

Sometimes, the composition has an a* value measured according to CIELAB of from −1 to zero. Other times, the composition has a b* value measured according to CIELAB of from 1 to 3.

In still other embodiments, the composition exhibits a notched Izod impact strength measured according to ASTM D256 of from 150 J/m to about 300 J/m; a ductility measured according to ASTM D256 of at least 20%; and a L* measured according to CIELAB of at least 90.

Also disclosed are articles made from such compositions that have a wall with a thickness of at least 0.3 mm and less than 1 mm. The article can be a part of a cellphone, a MP3 player, a computer, a laptop, a camera, a video recorder, an electronic tablet, a hand receiver, a kitchen appliance, or an electrical housing.

These and other non-limiting characteristics are more particularly described below.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium, and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e., one or more hydrogen atoms is replaced) or unsubstituted. Exemplary alkyl groups include, but are not limited to, methyl, ethyl, and isopropyl. It should be noted that alkyl is a subset of aliphatic.

The term "aromatic" refers to an array of atoms having a valence of at least one and comprising at least one aromatic group. The array of atoms may include heteroatoms such as nitrogen, sulfur, selenium, silicon, and oxygen, or may be composed exclusively of carbon and hydrogen. Aromatic groups may be substituted or unsubstituted. Exemplary aromatic groups include, but are not limited to, phenyl, pyridyl, furanyl, thienyl, naphthyl, and biphenyl.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms). It should be noted that aryl is a subset of aromatic.

The term "cycloaliphatic" refers to an array of atoms which is cyclic but which is not aromatic. The cycloaliphatic group may include heteroatoms such as nitrogen, sulfur, selenium, silicon, and oxygen in the ring, or may be composed exclusively of carbon and hydrogen. A cycloaliphatic group may comprise one or more noncyclic components. For example, a cyclohexylmethyl group ($C_6H_{11}CH_2$—) is a cycloaliphatic functionality, which comprises a cyclohexyl ring (the array of atoms which is cyclic but which is not aromatic) and a methylene group (the noncyclic component). Cycloaliphatic groups may be substituted or unsubstituted. Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "cycloalkyl" refers to an array of atoms which is cyclic but is not aromatic, and which is composed exclusively of carbon and hydrogen. Cycloalkyl groups may be substituted or unsubstituted. It should be noted that cycloalkyl is a subset of cycloaliphatic.

In the definitions above, the term "substituted" refers to at least one hydrogen atom on the named radical being substituted with another functional group, such as alkyl, halogen, —OH, —CN, —$NO_2$, —COOH, etc.

For thin yet large part designs of mobile devices, a high-modulus material is needed to both support the body and the display panel. The high flexural modulus reflects stiffness, or in other words that the molded part will maintain its shape. High ductility and good flow properties reflect how easily the polymeric composition can be poured into a mold for forming the shape of the part. Higher stiffness can be obtained by the addition of a mineral filler to a polymeric composition. However, the addition of mineral filler reduces the ductility and the flow properties of the polymeric composition. Even highly impact resistant polymers, such as polycarbonates, become brittle at room temperature at high filler loadings. Another conventional way of increasing stiffness is by increasing the weight average molecular weight of the polymer, but this typically also reduces the flow properties and makes it difficult to fill complex or thin-walled molds. Another concern is related to aesthetics; molded parts with mineral filler protruding from the surface are unsightly. Good flow properties can also aid in manufacturing by reducing in-mold stress which can lead to cracking. Cracking of the molded parts reduces the overall yield rate of production.

In addition, an ultra-white color is required for some special applications such as light shielding. Typical white pigments include inorganic compounds such as titanium dioxide ($TiO_2$), zinc sulfide (ZnS), and calcium carbonate ($CaCO_3$). Because $TiO_2$ has high hardness, it typically degrades the polycarbonate and can also damage glass fibers present in the polycarbonate. ZnS and $CaCO_3$ are not as hard as $TiO_2$, but are also less efficient both from color and light shielding points of view. Moreover, they still degrade the polycarbonate. Acidic quenchers are almost always used to minimize the degradation.

The present disclosure generally relates to polycarbonate compositions which exhibit a balance of good impact properties and a high degree of whiteness. The polycarbonate compositions comprise (A) at least one poly(aliphatic ester)-polycarbonate copolymer, (B) a polysiloxane-polycarbonate copolymer, (C) non-bonding glass fibers, and (D) titanium dioxide. The synergistic combination of these ingredients provide excellent impact strength, ductility and surface aesthetics.

As used herein, the terms "polycarbonate" and "polycarbonate polymer" mean compositions having repeating structural carbonate units of the formula (1):

in which at least about 60 percent of the total number of $R^1$ groups are aromatic organic radicals and the balance thereof are aliphatic, alicyclic, or aromatic radicals. An ester unit (—COO—) is not considered a carbonate unit, and a carbonate unit is not considered an ester unit. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O), —$S(O)_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

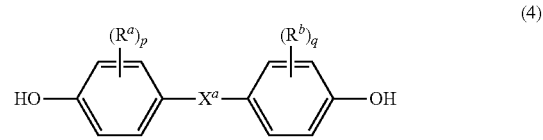

wherein $R^a$ and $R^b$ each represent a halogen atom or a monovalent hydrocarbon group and may be the same or different; p and q are each independently integers of 0 to 4; and $X^a$ represents one of the groups of formula (5):

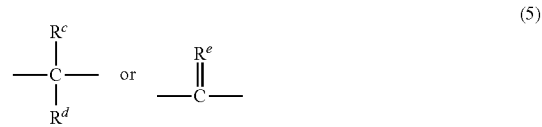

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Other useful dihydroxy compounds include aromatic dihydroxy compounds of formula (6):

(6)

wherein each $R^k$ is independently a $C_{1-10}$ hydrocarbon group, and n is 0 to 4. The halogen is usually bromine Examples of compounds that may be represented by the formula (6) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Polycarbonates may be branched. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

In specific embodiments, the dihydroxy compound used to form the polycarbonate has the structure of Formula (I):

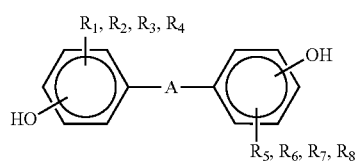

Formula (I)

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl) propane (i.e., bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl) cyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

The polycarbonate compositions of the present disclosure contain at least two polycarbonate copolymers. First, the polycarbonate compositions of the present disclosure contain at least one poly(aliphatic ester)-polycarbonate copolymer (A). The poly(aliphatic ester)-polycarbonate copolymer is made up of a combination of carbonate units and aliphatic ester units. The molar ratio of ester units to carbonate units can vary widely, for example from 1:99 to 99:1, or more specifically from 25:75 to 75:25, depending on the desired properties of the final compositions.

In embodiments, the ester unit may have the structure of Formula (II):

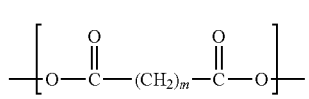

Formula (II)

wherein m is from about 4 to about 18. In some embodiments, m is from about 8 to about 10. The ester units may be derived from a $C_6$-$C_{20}$ aliphatic dicarboxylic acid (which includes the terminal carboxylate groups) or a reactive derivative thereof, including a $C_8$-$C_{12}$ aliphatic dicarboxylic acid. In some embodiments, the terminal carboxylate groups are derived from the corresponding dicarboxylic acid or reactive derivative thereof, such as the acid halide (specifically, the acid chloride), an ester, or the like. Exemplary dicarboxylic acids (from which the corresponding acid chlorides may be derived) include $C_6$ dicarboxylic acids such as hexanedioic acid (also referred to as adipic acid); $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_6$-$C_{20}$ range may be used.

A specific embodiment of the poly(aliphatic ester)-polycarbonate copolymer having ester units comprising a straight chain methylene group and a polycarbonate group is shown in Formula (III):

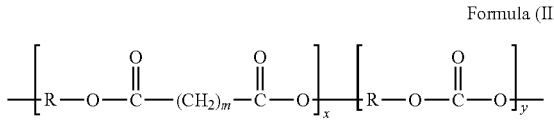

Formula (III)

where m is 4 to 18; x and y represent average molar percentages of the aliphatic ester units and the carbonate units in the copolymer. The average molar percentage ratio x:y may be from 99:1 to 1:99, including from about 13:87 to about 2:98, or from about 9:91 to about 2:98 or from about 8:92 to 13:87. Each R may be independently derived from a dihydroxy compound. In a specific exemplary embodiment, a useful poly(aliphatic ester)-polycarbonate copolymer comprises sebacic acid ester units and bisphenol A carbonate units (Formula (II), where m is 8, and the average molar ratio of x:y is 6:94). Such poly(aliphatic ester)-polycarbonate copolymers are commercially available as LEXAN HFD copolymers (LEXAN is a trademark of SABIC Innovative Plastics IP B. V.).

In embodiments, the poly(aliphatic ester) polycarbonate copolymer may have a weight average molecular weight of from about 15,000 to about 40,000, including from about 20,000 to about 38,000 (measured by GPC based on BPA polycarbonate standards). The polycarbonate compositions of the present disclosure may include from about 20 wt % to about 75 wt % of the poly(aliphatic ester)-polycarbonate copolymer.

In some embodiments of the present disclosure, the polycarbonate composition includes two poly(aliphatic ester)-polycarbonate copolymers, i.e., a first poly(aliphatic ester)-polycarbonate copolymer (A1) and a second poly(aliphatic ester)-polycarbonate copolymer (A2). The two poly(aliphatic ester)-polycarbonate copolymers may have the same or different ester unit and the same or different carbonate unit.

The second poly(aliphatic ester)-polycarbonate copolymer has a lower weight average molecular weight than the first poly(aliphatic ester)-polycarbonate copolymer. The second poly(aliphatic ester)-polycarbonate copolymer may have a weight average molecular weight of from about 15,000 to about 25,000, including from about 20,000 to about 22,000 (measured by GPC based on BPA polycarbonate standards). Referring to Formula (III), the second poly(aliphatic ester)-polycarbonate copolymer may have an average molar percentage ratio x:y of from about 4:96 to about 7:93. The first poly(aliphatic ester)-polycarbonate copolymer may have a weight average molecular weight of 30,000 to about 40,000, including from about 35,000 to about 38,000 (measured by GPC based on BPA polycarbonate standards). Referring to Formula (III), the first poly(aliphatic ester)-polycarbonate copolymer may have an average molar percentage ratio x:y of from about 7:93 to about 13:87. In embodiments, the weight ratio of the second poly(aliphatic ester)-polycarbonate copolymer to the first poly(aliphatic ester)-polycarbonate copolymer may be from about 1:4 to about 5:2 (i.e., from about 0.25 to about 2.5). Note the weight ratio described here is the ratio of the amounts of the two copolymers in the composition, not the ratio of the molecular weights of the two copolymers. The weight ratio between the two poly(aliphatic ester)-polycarbonate copolymers will affect the flow properties, ductility, and surface aesthetics of the final composition. Some embodiments contain more of the higher Mw copolymer than the lower Mw copolymer, i.e., the ratio of the second poly(aliphatic ester)-polycarbonate copolymer to the first poly(aliphatic ester)-polycarbonate copolymer is from 0:1 to 1:1. Other embodiments contain more of the lower Mw copolymer than the higher Mw copolymer, i.e., the ratio of the second poly(aliphatic ester)-polycarbonate copolymer to the first poly(aliphatic ester)-polycarbonate copolymer is from 1:1 to about 5:2. The compositions may include from about 35 to about 85 wt % of the first poly(aliphatic ester)-polycarbonate copolymer (i.e., the higher Mw copolymer) and the second poly(aliphatic ester)-polycarbonate copolymer (i.e., the lower Mw copolymer) combined. The composition may contain from about 20 to about 40 wt % of the first poly(aliphatic ester)-polycarbonate copolymer. The composition may contain from about 15 to about 55 wt % of the second poly(aliphatic ester)-polycarbonate copolymer.

The polycarbonate compositions of the present disclosure also contain a polysiloxane-polycarbonate copolymer (B).

This copolymer comprises polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (7) (sometimes referred to herein as 'siloxane'):

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. Generally, D may have an average value of 2 to about 1000, specifically about 2 to about 500, more specifically about 30 to about 100, or from about 35 to about 55. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer. D may be referred to as the siloxane block chain length.

In one embodiment, the polydiorganosiloxane blocks are provided by repeating structural units of formula (8):

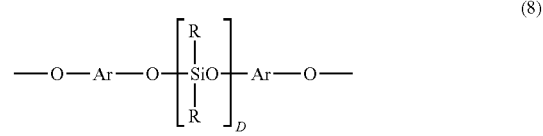

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (8) may be derived from a $C_6$-$C_{30}$ dihydroxyarylene compound, for example a dihydroxyarylene compound of formula (3), (4), or (6) above. Combinations comprising at least one of the foregoing dihydroxyarylene compounds may also be used.

Such units may be derived from the corresponding dihydroxy compound of the following formula (9):

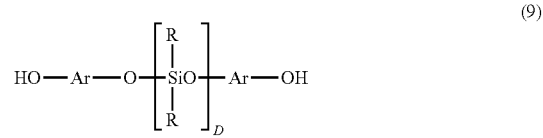

wherein Ar and D are as described above. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (10):

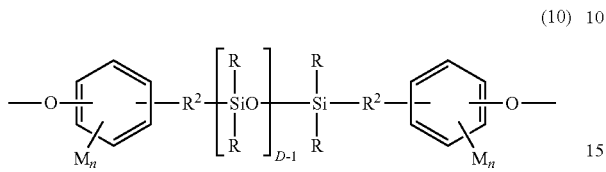

(10)

wherein R and D are as defined above. $R^2$ in formula (10) is a divalent $C_2$-$C_8$ aliphatic group. Each M in formula (10) may be the same or different, and may be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl, or tolyl; $R^2$ is a dimethylene, trimethylene, or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (11):

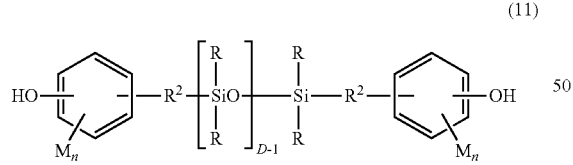

(11)

wherein R, D, M, $R^2$, and n are as described above.

Such dihydroxy polysiloxanes can be made by effecting a platinum catalyzed addition between a siloxane hydride of the formula (12),

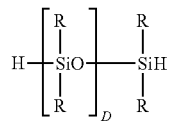

(12)

wherein R and D are as previously defined, and an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

In specific embodiments, where Ar of formula (8) is derived from resorcinol, the polydiorganosiloxane repeating units are derived from polysiloxane bisphenols of formula (13):

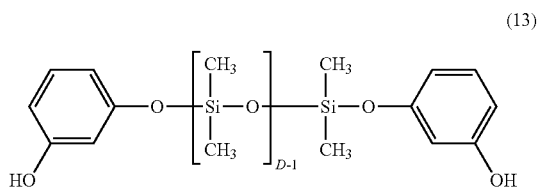

(13)

or, where Ar is derived from bisphenol A, from polysiloxane bisphenols of formula (14):

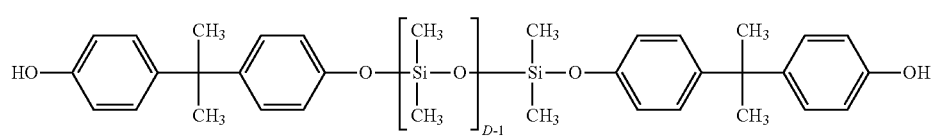

(14)

wherein D is as defined above.

In other specific embodiments, the polysiloxane units are derived from a polysiloxane bisphenol of formula (15):

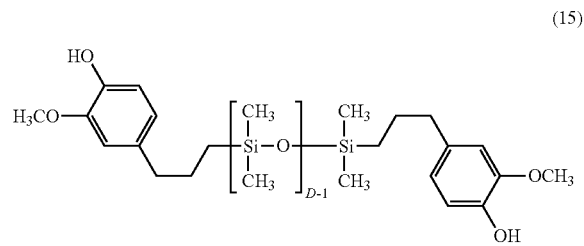

(15)

wherein D is as described in formula (7).

In yet other specific embodiments, the polysiloxane units are derived from polysiloxane bisphenol of formula (16):

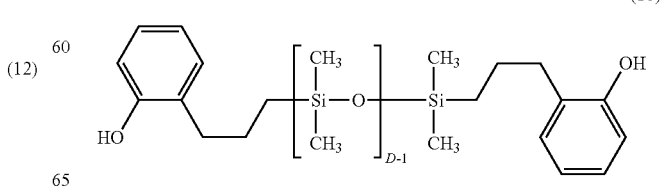

(16)

wherein D is as described in formula (7).

The siloxane blocks may make up from greater than zero to about 25 wt % of the polysiloxane-polycarbonate copolymer, including 4 wt % to about 25 wt %, from about 4 wt % to about 10 wt %, or from about 15 wt % to about 25 wt %. The polycarbonate blocks may make up from about 75 wt % to less than 100 wt % of the block copolymer, including from about 75 wt % to about 85 wt %. It is specifically contemplated that the polysiloxane-polycarbonate copolymer is a diblock copolymer. The polysiloxane-polycarbonate copolymer may have a weight average molecular weight of from about 28,000 to about 32,000. The polycarbonate compositions of the present disclosure may include from about 5 to about 25 wt % of the polysiloxane-polycarbonate copolymer, including from about 10 wt % to about 20 wt %. In particular embodiments, the composition comprises from about 0.5 wt % to about 6 wt % of siloxane originating from the polysiloxane-polycarbonate copolymer. The amount (by weight) of polysiloxane-polycarbonate copolymer is less than the amount of poly(aliphatic ester)-polycarbonate copolymer (A), usually by at least 10 wt % or by at least 20 wt % of the composition. Alternatively, the amount of polysiloxane-polycarbonate copolymer can be defined by the total siloxane block content that it contributes to the overall polycarbonate composition. In embodiments, the composition may have a siloxane block content of from about 0.5 wt % to about 5 wt % based on the total weight of the composition, including from about 0.9 wt % to about 4.0 wt %, or from about 2.0 wt % to about 3.0 wt %. Exemplary commercially available polysiloxane-polycarbonate copolymers are sold under the mark LEXAN® EXL by SABIC Innovative Plastics IP B. V.

The poly(aliphatic ester)-polycarbonate copolymer (A) may contain additional monomers if desired. Similarly, the polysiloxane-polycarbonate copolymer (B) may contain additional monomers if desired. These polycarbonate copolymers can be manufactured by processes known in the art, such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate compositions of the present disclosure also comprise non-bonding glass fibers (C). The term "glass" here refers generally to a material, natural or synthetic, which contains silicon dioxide ($SiO_2$) or silica as its main material. The glass fibers may be textile glass fibers such as E, A, C, ECR, R, S, D, and/or NE glass fibers, and are desirably E type glass fibers. The glass fibers may have an average length of from about 2 mm to about 5 mm, including from about 2 mm to about 4 mm. The glass fibers may have an average diameter of from about 12 microns to about 15.5 microns, including from about 12 microns to about 14 microns. The glass fibers may be present in the compositions of the present disclosure in amounts of from about 5 to about 35 wt %. In some embodiments, the compositions comprise from about 10 to about 30 wt % of the glass fibers, including from about 10 wt % to about 20 wt %.

The glass fibers are non-bonding. The term "non-bonding" refers to the fact that the glass fibers do not adhere to the polymeric ingredients in the polycarbonate composition, whereas "bonding" glass fibers adhere strongly to the polymeric ingredients. The non-bonding/bonding characteristics of the glass fibers can be controlled, for example, by coating the glass fibers with coatings such as an epoxy coating, polyvinyl acetate, particular polyester resins, starch, acrylic resins, melamine, polyvinyl chloride, polyethylene oxide, polyurethane, polyepoxide, or polyvinyl alcohol, or a silane coupling agent, to change the bonding properties between the glass fibers and the other polymeric ingredients in the polycarbonate composition. It has been discovered in the present disclosure that non-bonding glass fibers provide much better impact strength compared to bonding glass fibers or milled glass fibers. Industry standard milled glass fibers have a diameter of about 16 micrometers and average length of 1/64 to 1/16 inch (0.4 mm to 1.6 mm).

The polycarbonate compositions of the present disclosure also comprise titanium dioxide (D). The titanium dioxide has an average particle size of from about 30 nm to about 500 nm, including from about 100 nm to about 500 nm, or from about 150 nm to about 500 nm, or from about 100 nm to about 250 nm, or from about 150 nm to about 200 nm, or from about 30 nm to about 180 nm. In some embodiments, the titanium dioxide particles may have an inorganic coating, such as an alumina coating. In other embodiments, the titanium dioxide may have an organic coating, such as a polysiloxane coating. The titanium dioxide may be present in the compositions of the present disclosure in amounts of up to about 15 wt %, including from about 2 to about 15 wt %, or from about 5 to about 12 wt %.

The polycarbonate composition may, in some embodiments, further comprise an impact modifier (E). The impact modifier may include an elastomer-modified graft copolymer comprising (i) an elastomeric (i.e., rubbery) polymer substrate having a glass transition temperature (Tg) less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. As used herein, the terminology "(meth)acrylate monomers" refers collectively to acrylate monomers and methacrylate monomers.

A specific impact modifier of this type is a methyl methacrylate-butadiene-styrene (MBS) impact modifier wherein the butadiene substrate is prepared using above-described sulfonates, sulfates, or phosphates as surfactants.

Other exemplary elastomer-modified graft copolymers include acrylonitrile-butadiene-styrene (ABS), acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to about 50 wt %, optionally greater than or equal to about 60 wt % by weight of the graft polymer. The rubber is desirably present in an amount less than or equal to about 95 wt %, optionally less than or equal to about 90 wt % of the graft polymer.

A mixture of grafting monomers may also be used, to provide a graft copolymer. An example of a suitable mixture comprises a monovinylaromatic hydrocarbon and an acrylic monomer. Examples of graft copolymers suitable for use include, but are not limited to, acrylonitrile-butadiene-styrene (ABS) and methacrylonitrile-butadiene-styrene (MBS) resins. Suitable high-rubber acrylonitrile-butadiene-styrene resins are available from SABIC Innovative Plastics (formerly General Electric Company) as BLENDEX® grades 131, 336, 338, 360, and 415.

In this regard, the polycarbonate composition may have a softblock content of less than 3.5 wt % of the overall composition. In this regard, the softblock content refers to the portion of a polymer or a composition that is formed from elastomeric material. It is believed that the softblock content is proportional to the impact performance of the overall composition. For example, in a polysiloxane-polycarbonate copolymer, the siloxane blocks may be considered to contribute to the softblock content of the composition because of their elastomeric quality, in contrast to the rigid quality of the polycarbonate blocks.

In embodiments, the polycarbonate composition comprises from about 20 wt % to about 85 wt % of the poly(aliphatic ester)-polycarbonate copolymer (A); from about 5 wt % to about 25 wt % of the polysiloxane-polycarbonate copolymer (B); from about 5 wt % to about 35 wt % of the non-bonding glass fibers (C); and up to about 15 wt % of the titanium dioxide (D). When present, the impact modifier (E) may be present in the amount of from about 2 wt % to about 8 wt %. These values are based on the total weight of the composition. It should be noted that the at least one poly(aliphatic ester)-polycarbonate copolymer (A) may be a blend of two or more polycarbonate copolymers having different weight average molecular weights, and the recited about 20 wt % to about 85 wt % refers to the total amount of such polycarbonate copolymers (A) in the composition.

In additional embodiments, the polycarbonate composition comprises from about 15 wt % to about 55 wt % of the poly(aliphatic ester)-polycarbonate copolymer (A1) having a Mw of from about 15,000 to about 25,000; from about 20 wt % to about 75 wt % of the poly(aliphatic ester)-polycarbonate copolymer (A2) having a Mw of from about 30,000 to about 40,000; from about 5 wt % to about 25 wt % of the polysiloxane-polycarbonate copolymer (B); from about 10 wt % to about 30 wt % of the glass fibers (C); and from about 5 wt % to about 12 wt % of the titanium dioxide (D).

The polycarbonate compositions of the present disclosure have a combination of good impact strength and excellent whiteness. They have, at a minimum, a notched Izod impact strength measured according to ASTM D256 of at least 90 J/m; a ductility measured according to ASTM D256 of at least 20%; and a L* measured according to CIELAB of at least 90.

The whiteness of the polycarbonate compositions of the present disclosure is the L* as measured according to CIELAB. The present compositions have a L* of at least 90, including at least 92, at least 93, at least 94, or at least 95.

The polycarbonate compositions of the present disclosure may have a melt flow rate (MFR) at least 3 g/10 minutes when measured according to ASTM D1238 at 300° C., a 1.2 kg load, and a 6 minute flow time. In some embodiments, the MFR is at least 6 g/10 minutes, or at least 7 g/10 minutes. The MFR may reach a maximum of about 20 g/10 minutes.

The polycarbonate compositions of the present disclosure may exhibit a notched Izod impact strength (NII) measured according to ASTM D256 of at least 90 J/m, when measured at 23° C., 5 lbf, and 3.2 mm thickness. In some embodiments, the notched Izod impact strength of the composition is at least 150 J/m, including at least 200 J/m, at least 250 J/m, or at least 300 J/m. The notched Izod impact strength may reach a maximum of about 350 J/m. In some embodiments, the NII is from 150 J/m to about 300 J/m.

The ductility of the polycarbonate compositions is also measured according to ASTM D256 at 23° C., 5 lbf, and 3.2 mm thickness. The ductility of the compositions of the present disclosure is at least 20%. In embodiments, the ductility may be at least 80%, or may be 100%.

The polycarbonate compositions may exhibit a gloss measured according to ASTM D2457 (at 60°) of at least 60, including at least 80. The gloss may reach a maximum of about 95.

The polycarbonate compositions of the present disclosure may have a flexural modulus of at least 3000 MPa when measured according to ISO 178, including at least 3500 MPa, at least 4000 MPa, or at least 5000 MPa. The flexural modulus has reached a maximum of 7000 MPa.

The polycarbonate compositions of the present disclosure may have any combination of these properties (NII, ductility, L*, MFR, gloss, flexural modulus), and any combination of the listed values for these properties. It should be noted that some of the properties (e.g. NII) are measured using articles made from the polycarbonate composition; however, such properties are described as belonging to the polycarbonate composition for ease of reference.

In desirable embodiments, the composition exhibits a notched Izod impact strength measured according to ASTM D256 of at least 90 J/m; a ductility measured according to ASTM D256 of at least 20%; a L* measured according to CIELAB of at least 90; a melt flow rate measured according to ASTM D 1238 of at least 3 cm$^3$/10 min; and a flexural modulus measured according to ISO 178 of at least 3000 MPa.

In additional desirable embodiments, the composition contains at least 10 wt % of titanium dioxide; exhibits a notched Izod impact strength measured according to ASTM D256 of at least 200 J/m; exhibits a L* measured according to CIELAB of at least 95; and exhibits a ductility measured according to ASTM D256 of at least 20%.

In some embodiments, the composition exhibits a melt volume rate measured according to ASTM D 1238 of at least 4 cm$^3$/10 min; and a notched Izod impact strength measured according to ASTM D256 of at least 150 J/m.

In other specific embodiments, the composition exhibits a melt volume rate measured according to ASTM D 1238 of at least 2 cm$^3$/10 min; a flexural modulus measured according to ISO 178 of at least 3000 MPa; a notched Izod impact strength measured according to ASTM D256 of at least 90 J/m; and a gloss measured according to ASTM D2457 (at 60°) of at least 40.

In some other specific combinations, the polycarbonate composition has a melt volume rate (MVR) of from about 2 to about 20; a flexural modulus of from 3000 MPa to about 5000 MPa; and a notched Izod impact strength of from about 200 J/m to about 350 J/m.

In yet other embodiments, the polycarbonate composition exhibits a melt volume rate measured according to ASTM D 1238 of at least 4 cm$^3$/10 min; a flexural modulus measured according to ISO 178 of at least 3000 MPa; and a notched Izod impact strength measured according to ASTM D256 of at least 200 J/m.

In some additional embodiments, the polycarbonate composition exhibits a melt volume rate measured according to ASTM D 1238 of at least 4 cm$^3$/10 min; a flexural modulus measured according to ISO 178 of at least 3500 MPa; and a notched Izod impact strength measured according to ASTM D256 of at least 250 J/m.

In still another set of embodiments, the polycarbonate composition exhibits a melt volume rate measured according to ASTM D 1238 of at least 9 cm$^3$/10 min; a flexural modulus measured according to ISO 178 of at least 3000 MPa; and a notched Izod impact strength measured according to ASTM D256 of at least 300 J/m.

Other additives ordinarily incorporated in polycarbonate compositions of this type can also be used, with the proviso that the additives are selected so as to not significantly adversely affect the desired properties of the polycarbonate. Combinations of additives can be used. Such additives can be mixed at a suitable time during the mixing of the components for forming the composition. In embodiments, one or more additives are selected from at least one of the following: UV stabilizing additives, thermal stabilizing additives, mold release agents, colorants, gamma-stabilizing agents, and optical brighteners.

Exemplary antioxidant additives include, for example, organophosphites such as tris(nonyl phenyl)phosphite, tris (2,4-di-t-butylphenyl)phosphite (e.g., "IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 wt % of the overall polycarbonate composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 wt % of the overall polycarbonate composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 wt % of the overall polycarbonate composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 wt % of the overall polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 wt %, specifically 0.01 to 0.75 wt %, more specifically 0.1 to 0.5 wt % of the overall polycarbonate composition.

Besides the titanium dioxide (D), other colorants such as pigment and/or dye additives can also be present in order to offset any color that may be present in the polycarbonate resin and to provide desired color to the customer. Useful pigments can include, for example, inorganic pigments such as metal oxides and mixed metal oxides such as zinc oxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 wt % of the overall polycarbonate composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; naphthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 wt % of the overall polycarbonate composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 wt % of the overall polycarbonate composition.

Suitable optical brighteners are known in the art and include, for example, the optical brightener available as UVITEX OB from Ciba, and the optical brightener available as EASTOBRITE OB-1 from Eastman Chemical Company.

Shaped, formed, or molded articles comprising the polycarbonate compositions are also provided. The polycarbonate compositions may be molded into useful shaped articles by a variety of means such as injection molding, overmolding, extrusion, rotational molding, blow molding and thermoforming to form various molded articles. Such articles may include thin-walled articles for consumer goods like cellphones, MP3 players, computers, laptops, cameras, video recorders, electronic tablets, hand receivers, kitchen appliances, electrical housings, etc., e.g. a smart meter housing, and the like; electrical connectors, and components of lighting fixtures, ornaments, home appliances, roofs, greenhouses, sun rooms, swimming pool enclosures, Light Emitting Diodes (LEDs) and light panels, extruded film and sheet articles; electrical parts, such as relays; and telecommunications parts such as parts for base station terminals. The present disclosure further contemplates additional fabrication operations on said articles, such as, but not limited to, molding, in-mold decoration, baking in a paint oven, lamination, and/or thermoforming. The polycarbonate compositions are especially useful for making walls that have a thickness of at least 0.3 mm and less than 1 mm.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Table 1 lists the names and descriptions of the ingredients used in the following Examples.

TABLE 1

| Ingredient | Description | Mw | Trade name | Supplier |
|---|---|---|---|---|
| PAEBPA$_{low}$ | Sebacic acid-bisphenol A copolymer, 6.0 mol % sebacic acid, PCP (p-cumylphenol) endcapped | 21,400 | LEXAN | SABIC Innovative Plastics |
| PAEBPA$_{high}$ | Sebacic acid-bisphenol A copolymer, 8.5 mol % sebacic acid, PCP (p-cumylphenol) endcapped | 36,500 | LEXAN | SABIC Innovative Plastics |

TABLE 1-continued

| Ingredient | Description | Mw | Trade name | Supplier |
|---|---|---|---|---|
| $PC_{low}$ | Bisphenol A homopolymer, PCP (p-cumylphenol) endcapped | 21,700 | LEXAN | SABIC Innovative Plastics |
| $PC_{high}$ | Bisphenol A homopolymer, PCP (p-cumylphenol) endcapped | 29,600 | LEXAN | SABIC Innovative Plastics |
| PC-Si-1 | a BPA polycarbonate-polydimethylsiloxane copolymer comprising about 20% by weight of siloxane, 80% by weight of BPA, PCP (p-cumylphenol) endcapped, siloxane chain length is ~35-55 | 30,000 | LEXAN | SABIC Innovative Plastics |
| PC-Si-2 | a BPA polycarbonate-polydimethylsiloxane copolymer comprising about 6% by weight of siloxane, 94% by weight of BPA, PCP (p-cumylphenol) endcapped, siloxane chain length is about 35-55 | 23,000 | Lexan | SABIC Innovative Plastics |
| PCCD | poly(1,4-cyclohexane-dimethanol-1,4-cyclohexanedicarboxylate) resin, viscosity 2000 poise | 90,000 | ASPIRA | Eastman |
| PBT 315 | Polybutylene terephthalate | 120,000 | N/A | SABIC Innovative Plastics |
| NB-GF | Non-bonding glass fibers | N/A | Glass Fiber NEG EX1026 non-bonding | Nippon Electric Glass |
| Bond-GF | Bonding glass fibers | N/A | 473A-14C | Owens Corning |
| M-GF | Milled glass fibers | N/A | MF7980 | Lanxess PTE.LTD |
| F-GF | Flat glass fibers, bonding | N/A | CSG 3PA-830 | Nittobo |
| G931F | Bonding glass fibers, standard 13 microns PBT glass | N/A | ECS303A | CPIC |
| TSE-GF | Glass fibers, crystalline TSE standard, bonding | N/A | CRATEC | Owens Corning |
| FiberG | Fiberglass, bonding | N/A | 14CRETEC | Owens Corning |
| CB | Carbon black | N/A | BP800 | CABOT |
| $TiO_2$ | Titanium dioxide (coated with alumina, average particle size >100 nm) | | | Kronos |
| PETS | Pentaerythritol tetrastearate, >90% esterified, mold release agent | N/A | N/A | Asia Pacific PTE Ltd. |
| ADR 4368 | Chain extender | About 6,800 | JONCRYL | BASF |
| Phosphites | Stabilizers | N/A | Alkanox | CIBA |
| PEPQ | Phosphonous acid ester, PEPQ powder | N/A | Hostanox | Clariant |
| PA | Phosphoric acid $H_3PO_3$, 50% in water | N/A | N/A | Aldrich |

The compositions described below were compounded and molded using the conditions listed in Tables 2 and 3. The polycarbonate powders were pre-blended with the other ingredients except for the glass fibers. The pre-blended powders were extruded using a twin-screw extruder. The glass fibers were fed in a separate feeder during extrusion. The compounding conditions are listed in Table 2. The molding conditions are listed in Table 3.

TABLE 2

| Setting | Unit | Value |
|---|---|---|
| Barrel size | mm | 1500 |
| Die | mm | 430 |
| Zone 1 Temp | ° C. | 50 |
| Zone 2 Temp | ° C. | 100 |
| Barrel Temp | ° C. | 280 |
| Die Temp | ° C. | 280 |
| Screw speed | rpm | 400 |
| Throughput | Kg/hr | 40 |
| Torque | % | 47 |
| Vacuum 1 | MPa | 0.8 |

TABLE 3

| Step | Unit | Value |
|---|---|---|
| Pre-drying time | Hour | 3 |
| Pre-drying temp | ° C. | 120 |
| Hopper temp | ° C. | 50 |
| Zone 1 temp | ° C. | 275 |
| Zone 2 temp | ° C. | 290 |
| Zone 3 temp | ° C. | 300 |
| Nozzle temp | ° C. | 300 |
| Mold temp | ° C. | 100 |
| Screw speed | rpm | 80 |

TABLE 3-continued

| Step | Unit | Value |
| --- | --- | --- |
| Back pressure | kgf/cm$^2$ | 70 |
| Injection speed | mm/s | 20 |
| Holding pressure | kgf/cm$^2$ | 1800 |
| Transfer pressure | kgf/cm$^2$ | 2000 |

The MVR was tested using ASTM D1238 at 300° C., 1.2 kg load.

The melt flow rate (MFR) was tested using ASTM D1238 at 300° C. and 1.2 kg load, at both 6 minute flow time and 18 minutes flow time.

The notched Izod impact strength (NII) was measured using ASTM D256, 5 lbf, 23° C., and 3.2 mm thickness.

The ductility was measured using ASTM D256 at 23° C.

The flexural modulus was measured according to ISO 178.

The L*, a*, and b* values for color were measured according to CIELAB.

Examples E1-E3

The ingredients for nine Comparative Examples C1-C9 and three Examples E1-E3 are listed in Tables 4A and 4B below. It should be noted that carbon black was added as 0.3 phr; for every 100 grams of resin, 0.3 grams of carbon black was added.

TABLE 4A

| Ingredient | Unit | C1 | C2 | C3 | E1 | E2 | E3 |
| --- | --- | --- | --- | --- | --- | --- | --- |
| PAEBPA$_{low}$ | wt % | 72 | 0 | 54 | 54 | 52 | 49 |
| PAEBPA$_{high}$ | wt % | 18 | 0 | 36 | 26 | 23 | 21 |
| PC$_{low}$ | wt % | 0 | 55 | 0 | 0 | 0 | 0 |
| PC$_{high}$ | wt % | 0 | 25 | 0 | 0 | 0 | 0 |
| PC-Si-1 | wt % | 0 | 11 | 0 | 10 | 10 | 20 |
| MBS | wt % | 0 | 0 | 0 | 0 | 5 | 0 |
| ABS | wt % | 0 | 0 | 0 | 0 | 0 | 0 |
| S2001 | wt % | 0 | 0 | 0 | 0 | 0 | 0 |
| NB-GF | wt % | 10 | 9 | 10 | 10 | 10 | 10 |
| CB | phr | 0.3 | 0.3 | 0.3 | 0.3 | 0.3 | 0.3 |
| Softblock PC-Si | wt % | 0 | 1.8 | 0 | 1.7 | 1.7 | 3.3 |
| Softblock MBS | wt % | 0 | 0 | 0 | 0 | 3.9 | 0 |
| Softblock ABS | wt % | 0 | 0 | 0 | 0 | 0 | 0 |
| Softblock S2001 | wt % | 0 | 0 | 0 | 0 | 0 | 0 |
| Total Softblock | wt % | 0 | 1.8 | 0 | 1.7 | 5.6 | 3.3 |
| PAEBPA$_{low}$/PAEBPA$_{high}$ | | 4 | N/A | 1.5 | 2.1 | 2.3 | 2.3 |
| MVR | cc/10 min | 18 | 10 | 12.9 | 11.5 | 9.3 | 9.2 |
| Flex. modulus | MPa | 3330 | 3200 | 3300 | 3250 | 3140 | 3300 |
| NII | J/m | 61 | 280 | 81 | 279 | 305 | 311 |

TABLE 4B

| Ingredient | Unit | C4 | C5 | C6 | C7 | C8 | C9 |
| --- | --- | --- | --- | --- | --- | --- | --- |
| PAEBPA$_{low}$ | wt % | 54 | 54 | 54 | 54 | 54 | 54 |
| PAEBPA$_{high}$ | wt % | 32 | 30 | 31 | 31 | 30 | 30 |
| PC$_{low}$ | wt % | 0 | 0 | 0 | 0 | 0 | 0 |
| PC$_{high}$ | wt % | 0 | 0 | 0 | 0 | 0 | 0 |
| PC-Si-1 | wt % | 0 | 0 | 0 | 0 | 0 | 0 |
| MBS | wt % | 4 | 6 | 0 | 0 | 0 | 0 |
| ABS | wt % | 0 | 0 | 5 | 5 | 0 | 0 |
| S2001 | wt % | 0 | 0 | 0 | 0 | 6 | 6 |
| NB-GF | wt % | 10 | 10 | 10 | 10 | 10 | 10 |
| CB | phr | 0.3 | 0.3 | 0.3 | 0.3 | 0.3 | 0.3 |
| Softblock PC-Si | wt % | 0 | 0 | 0 | 0 | 0 | 0 |
| Softblock MBS | wt % | 3.1 | 4.7 | 0 | 0 | 0 | 0 |
| Softblock ABS | wt % | 0 | 0 | 3.5 | 3.5 | 0 | 0 |
| Softblock S2001 | wt % | 0 | 0 | 0 | 0 | 0 | 0 |
| Total Softblock | wt % | 3.1 | 4.7 | 3.5 | 3.5 | 0 | 0 |
| PAEBPA$_{low}$/PAEBPA$_{high}$ | | 1.7 | 1.8 | 1.7 | 1.7 | 1.8 | 1.8 |
| MVR | cc/10 min | 9.8 | 7.5 | 11.2 | 12.6 | 49 | 41 |
| Flex. modulus | MPa | 3170 | 3090 | 3140 | 3210 | 3250 | 3250 |
| NII | J/m | 274 | 268 | 274 | 260 | 80 | 88 |

Initially, comparing C1 to C3, it was seen that changing the ratio of the molecular weights of the HFD polymers did not affect the flexural modulus. A lower ratio of low MW to high MW, however, decreased the MVR about 28% and increased the NII about 33%.

Next, comparing examples C3, E1, and E3, increasing the polysiloxane-polycarbonate copolymer content (PC-Si) decreased the MVR but increased the NII. Again, the flexural modulus was not significantly affected.

Example E2 shows the effect of combining a second impact modifier (MBS) with the polysiloxane-polycarbonate copolymer. The properties of E2 and E3 are very similar, but E3 achieves the properties with a lower softblock content. In this regard, the softblock content is believed to provide the impact performance, and so obtaining the same performance with a lower softblock content is somewhat surprising. Examples E1 and E2 reflect a particularly good balance of properties.

Next, Comparative Examples C4-C9 completely replace the PC-Si with different impact modifiers. Using the polysiloxane-polycarbonate copolymer (E1, E3) achieves similar impact modification in comparison to these examples, but with a lower softblock content.

Examples E10-E13

Some examples were made to compare the results when 20 wt % of glass fibers was used instead of 10 wt %. Comparative Examples C10, C11 and Examples E10-E13 are described in Table 5 below:

TABLE 5

| Ingredient | Unit | E10 | E11 | E12 | E13 | C10 | C11 |
|---|---|---|---|---|---|---|---|
| PAEBPA$_{low}$ | wt % | 54 | 58 | 36 | 36 | 0 | 0 |
| PAEBPA$_{high}$ | wt % | 26 | 24 | 24 | 28 | 0 | 0 |
| PC$_{low}$ | wt % | 0 | 0 | 0 | 0 | 20 | 38 |
| PC$_{high}$ | wt % | 0 | 0 | 0 | 0 | 42.5 | 36 |
| PC-Si-1 | wt % | 10 | 5 | 20 | 10 | 17.5 | 0 |
| MBS | wt % | 0 | 3 | 0 | 6 | 0 | 0 |
| S2001 | wt % | 0 | 0 | 0 | 0 | 0 | 6 |
| NB-GF | wt % | 10 | 10 | 20 | 20 | 20 | 20 |
| CB | phr | 0.3 | 0.3 | 0.3 | 0.3 | 0.3 | 0.3 |
| Soft block PC-Si | wt % | 1.7 | 0.8 | 3.3 | 1.7 | 2.9 | 0 |
| Soft block MBS | wt % | 0 | 2.3 | 0 | 4.7 | 0 | 0 |
| Soft block S2001 | wt % | 0 | 0 | 0 | 0 | 0 | 0 |
| Total soft block | wt % | 1.7 | 3.2 | 3.3 | 6.3 | 2.9 | 0 |
| PAEBPA$_{low}$/PAEBPA$_{high}$ | | 2.1 | 2.4 | 1.5 | 1.3 | NA | NA |
| MVR | cc/10 min | 10.7 | 13.9 | 5.86 | 2.67 | 4.38 | 3.5 |
| Flex. modulus | MPa | 3540 | 3380 | 5030 | 4990 | 5130 | 5240 |
| NII | J/m | 276 | 206 | 179 | 98 | 260 | 238 |
| Gloss | % | 68.46 | 71.88 | 47.04 | 43.4 | 36.82 | 36.8 |

Comparing E12/E13 to C10/C11, it was seen that compositions containing the HFD polymers (E12/E13) exhibited higher gloss compared to BPA homopolymers (C10/C11). Example E12 reflects a particularly good balance of properties.

Compositions E10-E13 further illustrate that the combination of PAEBPA$_{low}$ and PAEBPA$_{high}$ achieved good impact (at least 90 J/m) and surface gloss properties (at least 40). A relatively high amount of PAEBPA$_{low}$ compared to PAEBPA$_{high}$ in particular improved the flow properties.

Comparing E2 to E13 illustrates that increasing the glass fiber content decreases the MVR, increases the flexural modulus, and decreases the NII.

Examples E20-E30

Next, compositions were made containing 30 wt % glass fibers, and varied with different loadings of the polysiloxane-polycarbonate copolymer. Example Compositions E20-E30 and Comparative Example C20 are described in Tables 6A and 6B below:

TABLE 6A

| Ingredient | Unit | E20 | E21 | E22 | E23 | E24 | E25 | C20 |
|---|---|---|---|---|---|---|---|---|
| PAEBPA$_{low}$ | wt % | 0 | 16.25 | 32.5 | 0 | 16.25 | 32.5 | 0 |
| PAEBPA$_{high}$ | wt % | 65 | 48.75 | 32.5 | 60 | 43.75 | 27.5 | 0 |
| PC$_{low}$ | wt % | 0 | 0 | 0 | 0 | 0 | 0 | 59 |
| PC-Si-1 | wt % | 5 | 5 | 5 | 10 | 10 | 10 | 11 |
| NB-GF | wt % | 30 | 30 | 30 | 30 | 30 | 30 | 30 |
| TiO$_2$ | wt % | 5 | 5 | 5 | 5 | 5 | 5 | 5 |
| PAEBPA$_{low}$/PAEBPA$_{high}$ | | 0 | 0.3 | 1 | 0 | 0.4 | 1.2 | NA |

TABLE 6A-continued

| Ingredient | Unit | E20 | E21 | E22 | E23 | E24 | E25 | C20 |
|---|---|---|---|---|---|---|---|---|
| MVR | cc/10 min | 5.9 | 5.81 | 8.19 | 4.17 | 6.23 | 7.14 | 11.3 |
| Flex. modulus | MPa | 6560 | 6470 | 6530 | 6220 | 6150 | 6250 | 5780 |
| NII | J/m | 94.6 | 106 | 102 | 140 | 139 | 123 | 151 |

TABLE 6B

| Ingredient | Unit | E26 | E27 | E28 | E29 | E30 |
|---|---|---|---|---|---|---|
| PAEBPA$_{low}$ | wt % | 47 | 59 | 16.25 | 32.5 | 55 |
| PAEBPA$_{high}$ | wt % | 12 | 0 | 38.75 | 22.5 | 0 |
| PC$_{low}$ | wt % | 0 | 0 | 0 | 0 | 0 |
| PC-Si-1 | wt % | 11 | 11 | 15 | 15 | 15 |
| NB-GF | wt % | 30 | 30 | 30 | 30 | 30 |
| TiO$_2$ | wt % | 5 | 5 | 5 | 5 | 5 |
| PAEBPA$_{low}$/PAEBPA$_{high}$ | | 3.9 | NA | 0.4 | 1.4 | NA |
| MVR | cc/10 min | 12.3 | 16.4 | 4.35 | 8.02 | 14.7 |
| Flex. modulus | MPa | 5770 | 5850 | 5900 | 6030 | 5750 |
| NII | J/m | 154 | 135 | 180 | 136 | 155 |

Comparing the contents of Tables 4A-6B, it was seen that generally, increasing the glass fiber content increased the flexural modulus and decreased the NII. Increasing the glass fiber content generally decreased the MVR, but this could be compensated by changing the polycarbonate split ratio.

Comparing E21/E24/E28 and E22/E25/E29, it was seen that increasing the polysiloxane-polycarbonate copolymer content and decreasing the PAEBPA$_{high}$ decreased the MVR and decreased the flexural modulus. However, the NII generally increased. This is believed to be due to molecular weight differences. The combination of PAEBPA$_{low}$, PAEBPA$_{high}$, and PC-Si results in good balance between flow and ductile properties. Looking at E26, this effect could be maintained at PAEBPA$_{low}$/PAEBPA$_{high}$ ratios up to 4.

Comparing E28 to E29, at a given loading of polysiloxane-polycarbonate copolymer, the balance between MVR and NII can be varied by changing the PAEBPA$_{low}$/PAEBPA$_{high}$ ratio.

Examples E31-E39

Six Comparative Examples C30-C35 and Examples E31-E39 are described in Tables 7A and 7B. These compositions were made with 10 wt % glass fibers.

TABLE 7A

| Ingredient | Unit | C30 | C31 | E31 | E32 | E33 | E34 | E35 | C32 |
|---|---|---|---|---|---|---|---|---|---|
| PAEBPA$_{low}$ | wt % | 0 | 72 | 70 | 66.72 | 64.61 | 64.61 | 53.61 | 32.11 |
| PAEBPA$_{high}$ | wt % | 0 | 18 | 9.22 | 10 | 12.11 | 14.61 | 25.61 | 57.11 |
| PETS | wt % | 0 | 0 | 0.27 | 0.27 | 0.27 | 0.27 | 0.27 | 0.27 |
| ADR 4368 | wt % | 0 | 0 | 0.15 | 0.15 | 0.15 | 0.15 | 0.15 | 0.15 |
| Phosphites | wt % | 0 | 0 | 0.06 | 0.06 | 0.06 | 0.06 | 0.06 | 0.06 |
| PC-Si-1 | wt % | 11 | 0 | 10 | 12.5 | 12.5 | 10 | 10 | 0 |
| MBS | wt % | 0 | 0 | 0 | 0 | 0 | 0 | 0 | 0 |
| NB-GF | wt % | 9 | 10 | 10 | 10 | 10 | 10 | 10 | 10 |
| CB | wt % | 0 | 0 | 0.3 | 0.3 | 0.3 | 0.3 | 0.3 | 0.3 |
| TiO$_2$ | wt % | 0 | 0 | 0 | 0 | 0 | 0 | 0 | 0 |
| % Softblock PC-Si | wt % | 1.8 | 0 | 1.7 | 2.1 | 2.1 | 1.7 | 1.7 | 0 |
| % Softblock MBS | wt % | 0 | 0 | 0 | 0 | 0 | 0 | 0 | 0 |
| Total softblock | wt % | 1.8 | 0 | 1.7 | 2.1 | 2.1 | 1.7 | 1.7 | 0 |
| PAEBPA$_{low}$/PAEBPA$_{high}$ | | NA | 4 | 7.6 | 6.7 | 5.3 | 4.4 | 2.1 | 0.6 |
| MVR | CC/10 min | 10 | 18 | 13.7 | 12.55 | 12.02 | 11.63 | 8.94 | 5.87 |
| Flex. modulus | MPa | 3200 | 3330 | — | — | — | 3341 | 3370 | 3219 |
| NII | J/m | 280 | 61 | 214 | 235 | 250 | 257 | 305 | 298 |

TABLE 7B

| Ingredient | Unit | E36 | E37 | E38 | C33 | C34 | E39 | C35 |
|---|---|---|---|---|---|---|---|---|
| PAEBPA$_{low}$ | wt % | 72 | 57.61 | 56.26 | 53.61 | 52.26 | 63.25 | 30.76 |
| PAEBPA$_{high}$ | wt % | 9.22 | 23.61 | 22.26 | 31.61 | 30.26 | 13.27 | 55.76 |
| PETS | wt % | 0.27 | 0.27 | 0.27 | 0.27 | 0.27 | 0.27 | 0.27 |
| ADR 4368 | wt % | 0.15 | 0.15 | 0.15 | 0.15 | 0.15 | 0.15 | 0.15 |
| Phosphites | wt % | 0.06 | 0.06 | 0.06 | 0.06 | 0.06 | 0.06 | 0.06 |
| PC-Si-1 | wt % | 5 | 5 | 5 | 0 | 0 | 10 | 0 |
| MBS | wt % | 3 | 3 | 3 | 4 | 4 | | |
| NB-GF | wt % | 10 | 10 | 10 | 10 | 10 | 10 | 10 |
| CB | wt % | 0.3 | 0.3 | 0 | 0.3 | 0 | | |
| TiO$_2$ | wt % | 0 | 0 | 3 | 0 | 3 | 3 | 3 |
| % Softblock PC-Si | wt % | 0.8 | 0.8 | 0.8 | 0 | 0.0 | 1.7 | 0.0 |
| % Softblock MBS | wt % | 2.3 | 2.3 | 2.3 | 3.1 | 3.1 | 0.0 | 0.0 |
| Total softblock | wt % | 3.2 | 3.2 | 3.2 | 3.1 | 3.1 | 1.7 | 0.0 |
| PAEBPA$_{low}$/PAEBPA$_{high}$ | | 7.8 | 2.4 | 2.5 | 1.7 | 1.7 | 4.8 | 0.6 |

TABLE 7B-continued

| Ingredient | Unit | E36 | E37 | E38 | C33 | C34 | E39 | C35 |
|---|---|---|---|---|---|---|---|---|
| MVR | cc/10 min | 14.85 | 10.58 | 10.34 | 8.87 | 8.44 | 13.24 | 6.39 |
| Flex. modulus | MPa | — | 3140 | 3164 | 3133 | 3115 | 3233 | 3182 |
| NII | J/m | 209 | 282 | 266 | 276 | 246 | 222 | 196 |

Generally, increasing the $PAEBPA_{low}$ content led to an increase in MVR. However, once the $PAEBPA_{low}$ content was above 65 wt %, the NII decreased dramatically. In addition, E36-E38, containing both the PC-Si and MBS, had a good balance between NII and MVR. Example E31 reflects a particularly good balance of properties.

Examples E40-E53

Comparative Examples C40, C41 and Examples E40-E53 are described in Tables 8A and 8B. These Example compositions were made with 20 wt % glass fibers. Example C40 contained 38 wt % of a bisphenol-A homopolymer with a Mw of about 21,800; 35.64 wt % of a bisphenol-A homopolymer with a Mw of about 30,500; 20 wt % glass fibers; 6 wt % of a PMMA-g-PBA-co-PDMS core-shell impact modifier, 0.3 wt % of an UV absorber, and 0.06 wt % of phosphite. Examples E40, E42, and E52 reflect a particularly good balance of properties. It is expected that the flexural modulus for Examples E40-E45 and E48-50 should be between 5000 MPa and 6000 MPa.

Examples E60

Comparative Examples C60, C61, and Examples E60 are described in Table 9. These compositions were made with different impact modifiers. The PC-Si had higher NII, MVR, and flexural modulus with a lower softblock content.

TABLE 9

| Ingredient | Unit | E60 | C60 | C61 |
|---|---|---|---|---|
| $PAEBPA_{low}$ | wt % | 54 | 54 | 54 |
| $PAEBPA_{high}$ | wt % | 26 | 32 | 31 |
| PC-Si-1 | wt % | 10 | 0 | 0 |
| MBS | wt % | 0 | 4 | 0 |
| ABS | wt % | 0 | 0 | 5 |
| NB-GF | wt % | 10 | 10 | 10 |
| $TiO_2$ | wt % | 3 | 3 | 3 |
| Softblock PC-Si | wt % | 1.7 | 0 | 0 |
| Softblock MBS | wt % | 0 | 3.1 | 0 |
| Softblock ABS | wt % | 0 | 0 | 3.5 |
| Total softblock | wt % | 1.7 | 3.1 | 3.5 |
| $PAEBPA_{low}/PAEBPA_{high}$ | | 2.1 | 1.7 | 1.7 |

TABLE 8A

| Ingredient | Unit | C40 | C41 | E40 | E41 | E42 | E43 | E44 | E45 |
|---|---|---|---|---|---|---|---|---|---|
| $PAEBPA_{low}$ | wt % | — | 64 | 60 | 60 | 58.36 | 57.5 | 57.344 | 56.72 |
| $PAEBPA_{high}$ | wt % | — | 16 | 5 | 6.72 | 5 | 9.22 | 7.032 | 5 |
| PETS | wt % | — | 0 | 0.27 | 0.27 | 0.27 | 0.27 | 0.27 | 0.27 |
| ADR 4368 | wt % | — | 0 | 0.15 | 0.15 | 0.15 | 0.15 | 0.15 | 0.15 |
| Phosphites | wt % | 0.06 | 0 | 0.06 | 0.06 | 0.06 | 0.06 | 0.06 | 0.06 |
| PC-Si-1 | wt % | — | 0 | 14.22 | 12.5 | 15.86 | 12.5 | 14.844 | 17.5 |
| NB-GF | wt % | 20 | 20 | 20 | 20 | 20 | 20 | 20 | 20 |
| CB | wt % | — | 0 | 0.3 | 0.3 | 0.3 | 0.3 | 0.3 | 0.3 |
| $TiO_2$ | wt % | — | 0 | 0 | 0 | 0 | 0 | 0 | 0 |
| % softblock | wt % | | 0 | 2.3 | 2.1 | 2.6 | 2.1 | 2.4 | 2.9 |
| $PAEBPA_{low}/PAEBPA_{high}$ | | | 4 | 12 | 8.9 | 11 | 6.2 | 8.2 | 11 |
| MVR | cc/10 min | 4 | 9 | 9.33 | 9.43 | 8.96 | 8.9 | 8.53 | 8.37 |
| Flex modulus | MPa | 5240 | 5270 | — | — | — | — | — | — |
| Notched Izod | J/m | 238 | 90 | 191 | 183 | 199 | 191 | 193 | 195 |

TABLE 8B

| Ingredient | Unit | E46 | E47 | E48 | E49 | E50 | E51 | E52 | E53 |
|---|---|---|---|---|---|---|---|---|---|
| $PAEBPA_{low}$ | wt % | 55.61 | 55.61 | 55 | 55 | 55 | 54.26 | 35.61 | 33.61 |
| $PAEBPA_{high}$ | wt % | 3.61 | 12.61 | 6.72 | 11.72 | 9.22 | 11.26 | 23.61 | 45.61 |
| PETS | wt % | 0.27 | 0.27 | 0.27 | 0.27 | 0.27 | 0.27 | 0.27 | 0.27 |
| ADR 4368 | wt % | 0.15 | 0.15 | 0.15 | 0.15 | 0.15 | 0.15 | 0.15 | 0.15 |
| Phosphites | wt % | 0.06 | 0.06 | 0.06 | 0.06 | 0.06 | 0.06 | 0.06 | 0.06 |
| PC-Si-1 | wt % | 20 | 11 | 17.5 | 12.5 | 15 | 11 | 20 | |
| NB-GF | wt % | 20 | 20 | 20 | 20 | 20 | 20 | 20 | 20 |
| CB | wt % | 0.3 | 0.3 | 0.3 | 0.3 | 0.3 | | 0.3 | 0.3 |
| $TiO_2$ | wt % | 0 | 0 | 0 | 0 | 0 | 3 | 0 | 0 |
| % softblock | wt % | 3.3 | 1.8 | 2.9 | 2.1 | 2.5 | 1.8 | 3.3 | 0.0 |
| $PAEBPA_{low}/PAEBPA_{high}$ | | 15 | 4.4 | 8.2 | 4.7 | 6 | 4.8 | 1.5 | 0.7 |
| MVR | cc/10 min | 7.45 | 8.06 | 7.94 | 8.6 | 8.08 | 9.07 | 4.51 | 5.04 |
| Flex modulus | MPa | 5028 | 5165 | — | — | — | 5129 | 5021 | 5513 |
| Notched Izod | J/m | 203 | 199 | 196 | 196 | 196 | 190 | 267 | 237 |

TABLE 9-continued

| Ingredient | Unit | E60 | C60 | C61 |
|---|---|---|---|---|
| MVR | cc/10 min | 12.1 | 10.8 | 11 |
| Flex. modulus | MPa | 3790 | 3500 | 3340 |
| NII | J/m | 227 | 194 | 212 |

Examples E61-E64

Examples E61-E64 are described in Table 10. These four examples reflected a good balance of properties.

TABLE 10

| Ingredient | Unit | E61 | E62 | E63 | E64 |
|---|---|---|---|---|---|
| PAEBPA$_{low}$ | wt % | 54 | 71 | 36 | 59.27 |
| PAEBPA$_{high}$ | wt % | 25.27 | 9.27 | 23.27 | 5 |
| PC-Si-1 | wt % | 10 | 9 | 20 | 15 |
| NB-GF | wt % | 10 | 10 | 20 | 20 |
| PETS | wt % | 0.27 | 0.27 | 0.27 | 0.27 |
| Phosphites | wt % | 0.06 | 0.06 | 0.06 | 0.06 |
| ADR 4368 | wt % | 0.1 | 0.1 | 0.1 | 0.1 |
| CB | wt % | 0.3 | 0.3 | 0.3 | 0.3 |
| PAEBPA$_{low}$/PAEBPA$_{high}$ | | 2.1 | 7.7 | 1.6 | 11.9 |

Examples C70-C78

Nine different resins C70-C78 are described in Table 11. These compositions were made with different types of glass fibers (non-bonding, bonding, milled) and with different ratios of BAEBPA$_{low}$/BAEBPA$_{high}$.

TABLE 11

| Ingredient | Unit | C70 | C71 | C72 | C73 | C74 | C75 | C76 | C77 | C78 |
|---|---|---|---|---|---|---|---|---|---|---|
| PAEBPAlow | wt % | 54 | 54 | 54 | 61 | 61 | 61 | 71 | 71 | 71 |
| PAEBPAhigh | wt % | 25.27 | 25.27 | 25.3 | 19.22 | 19.22 | 19.22 | 9.22 | 9.22 | 9.22 |
| PC-Si-1 | wt % | 10 | 10 | 10 | 9 | 9 | 9 | 9 | 9 | 9 |
| NB-GF | wt % | 10 | | | 10 | | | 10 | | |
| Bond-GF | wt % | | 10 | | | 10 | | | 10 | |
| M-GF | wt % | | | 10 | | | 10 | | | 10 |
| CB | wt % | 0.3 | 0.3 | 0.3 | 0.3 | 0.3 | 0.3 | 0.3 | 0.3 | 0.3 |
| PETS | wt % | 0.27 | 0.27 | 0.27 | 0.27 | 0.27 | 0.27 | 0.27 | 0.27 | 0.27 |
| ADR4368 | wt % | 0.1 | 0.1 | 0.1 | 0.15 | 0.15 | 0.15 | 0.15 | 0.15 | 0.15 |
| Phosphites | wt % | 0.06 | 0.06 | 0.06 | 0.06 | 0.06 | 0.06 | 0.06 | 0.06 | 0.06 |
| PAEBPAlow/PAEBPAhigh | | 2.1 | 2.1 | 2.1 | 3.2 | 3.2 | 3.2 | 7.7 | 7.7 | 7.7 |
| MFR 6 min. | g/10 min | 8.3 | 9.1 | 12.7 | 10.5 | 10.7 | 15.4 | 13.6 | 14.3 | 19.6 |
| Flex. Mod. | MPa | 3535 | 3508 | 2564 | NA | 3609 | NA | 3656 | 3566 | 2513 |
| NII | J/m | 286 | 166 | 106 | 257 | 151 | 90 | 219 | 145 | 96 |
| Ductility | % | 100 | 100 | 0 | 100 | 100 | 0 | 100 | 100 | 0 |

It is seen that using the non-bonding glass fibers or the bonding glass fibers are clearly advantageous compared to milled fibers. The NII is on average ~160% higher for non-bonding fibers and ~60% for bonding glass fibers, and the ductility is 100%. In contrast, the compositions with the milled fibers have a lower impact strength, are completely brittle, and have worse flexural modulus. The MFR decreased ~69% on average for the non-bonding or bonding glass fibers compared to the milled fibers, but is still in acceptable ranges. It is believed that the milled fibers have such high MFR because they have degraded the polycarbonate. As the BAEBPA$_{low}$/BAEBPA$_{high}$ ratio increased, the MFR increased and the NII decreased.

Examples E80-E82

Nine Comparative Examples C80-C88 and three Examples E80-E82 are described in Table 12. These compositions were made with different types of glass fibers (non-bonding vs. flat) and at different glass fiber loadings.

TABLE 12

| Ingredient | Unit | C80 | C81 | C82 | C83 | C84 | C85 | E80 | C86 | E81 | C87 | E82 | C88 |
|---|---|---|---|---|---|---|---|---|---|---|---|---|---|
| PAEBPA$_{low}$ | g | 54 | 71 | 36 | 59.3 | 16.3 | 16.3 | 54 | 71 | 36 | 59.3 | 16.3 | 16.3 |
| PAEBPA$_{high}$ | g | 25.3 | 9.3 | 23.3 | 5 | 38.8 | 38.8 | 25.3 | 9.3 | 23.3 | 5 | 38.8 | 38.8 |
| PC-Si-1 | g | 10 | 9 | 20 | 15 | 15 | 15 | 10 | 9 | 20 | 15 | 15 | 15 |
| NB-GF | g | 10 | | 20 | | 30 | | 10 | | 20 | | 30 | |
| F-GF | g | | 10 | | 20 | | 30 | | 10 | | 20 | | 30 |

TABLE 12-continued

| Ingredient | Unit | C80 | C81 | C82 | C83 | C84 | C85 | E80 | C86 | E81 | C87 | E82 | C88 |
|---|---|---|---|---|---|---|---|---|---|---|---|---|---|
| CB | g | 0.3 | 0.3 | 0.3 | 0.3 | 0.3 | 0.3 | | | | | | |
| $TiO_2$ | g | | | | | | | 5 | 5 | 5 | 5 | 5 | 5 |
| PETS | g | 0.27 | 0.27 | 0.27 | 0.27 | 0.27 | 0.27 | 0.27 | 0.27 | 0.27 | 0.27 | 0.27 | 0.27 |
| ADR 4368 | g | 0.1 | 0.1 | 0.1 | 0.1 | 0.1 | 0.1 | 0.1 | 0.1 | 0.1 | 0.1 | 0.1 | 0.1 |
| Phosphites | g | 0.06 | 0.06 | 0.06 | 0.06 | 0.06 | 0.06 | 0.06 | 0.06 | 0.06 | 0.06 | 0.06 | 0.06 |
| $PAEBPA_{low}$/$PAEBPA_{high}$ | | 2.1 | 7.6 | 1.5 | 11.9 | 0.4 | 0.4 | 2.1 | 7.6 | 1.5 | 11.9 | 0.4 | 0.4 |
| MFR 6 min | g/10 min | 12.4 | 18.5 | 6.88 | 14.3 | 4.29 | 7.42 | 14 | 21.5 | 7.56 | 16.6 | 4.71 | 6.01 |
| MFR 18 min | g/10 min | 13.8 | 21.4 | 7.88 | 16.9 | 4.64 | 7.18 | 16 | 24.6 | 8.57 | 18.9 | 5.91 | 7.77 |
| Flex. Mod. | MPa | 3220 | 3360 | 4810 | 5050 | 6540 | 6810 | 3150 | 3320 | 4300 | 4780 | 5850 | 6280 |
| NII | J/m | 266 | 165 | 244 | 168 | 180 | 187 | 256 | 101 | 229 | 115 | 196 | 125 |
| Ductility | % | 100 | 100 | 100 | 0 | 100 | 0 | 100 | 0 | 100 | 0 | 100 | 0 |

Comparing C84/C85 and E82/C88, it is seen that the flat fibers (F-GF) have a higher MFR, which is attributed to degradation of the polycarbonate by the F-GF. Both glass fibers gave good impact strength, but the flat fibers only have 0% ductility. Moreover, significant difference was found between the two glass fibers when $TiO_2$ was present. When $TiO_2$ was present, the NII for the flat fibers was only 64% that of the non-bonding fibers (E82 vs. C88).

Reviewing all of the examples, all of the compositions containing non-bonding fibers had 100% ductility, whereas all but one of the flat fiber compositions had 0% ductility. All of the compositions containing non-bonding fibers also had better impact strength. This is attributed to a combined effect between the PC-Si, non-bonding glass fibers, and the $TiO_2$ (when included).

Examples E85-96

15 Comparative Examples C89-C103 and 12 Examples E85-E96 are described in Tables 13A-13C. These compositions varied in the amount of PC-Si and in the loading of $TiO_2$.

TABLE 13A

| Ingredient | Unit | C89 | C90 | C91 | C92 | C93 | C94 | C95 | C96 | C97 |
|---|---|---|---|---|---|---|---|---|---|---|
| $PAEBPA_{low}$W | g | | 34.64 | 69.2 | | 32.14 | 64.2 | | 29.64 | 59.2 |
| $PAEBPA_{high}$ | g | 69.2 | 34.64 | | 64.2 | 32.14 | | 59.2 | 29.64 | |
| PC-Si-1 | g | 10 | 10 | 10 | 15 | 15 | 15 | 20 | 20 | 20 |
| NB-GF | g | 20 | 20 | 20 | 20 | 20 | 20 | 20 | 20 | 20 |
| $TiO_2$ | g | 0 | 0 | 0 | 0 | 0 | 0 | 0 | 0 | 0 |
| PETS | g | 0.27 | 0.27 | 0.27 | 0.27 | 0.27 | 0.27 | 0.27 | 0.27 | 0.27 |
| ADR 4368 | g | 0.1 | 0.1 | 0.1 | 0.1 | 0.1 | 0.1 | 0.1 | 0.1 | 0.1 |
| CB | g | 0.3 | 0.3 | 0.3 | 0.3 | 0.3 | 0.3 | 0.3 | 0.3 | 0.3 |
| Phosphites | g | 0.06 | 0.06 | 0.06 | 0.06 | 0.06 | 0.06 | 0.06 | 0.06 | 0.06 |
| $PAEBPA_{low}$/$PAEBPA_{high}$ | | 0 | 1 | NA | 0 | 1 | NA | 0 | 1 | NA |
| MFR 6 min. | g/10 min | 3.52 | 7.64 | 18.5 | 3.28 | 7.12 | 15.9 | 2.9 | 6.13 | 12.9 |
| Flex. Mod. | MPa | 4600 | 4720 | 4980 | 4460 | 4550 | 4600 | 4420 | 4510 | 4550 |
| NII | J/m | 258 | 216 | 150 | 265 | 217 | 160 | 281 | 251 | 167 |
| Ductility | % | 100 | 100 | 0 | 100 | 100 | 80 | 100 | 100 | 80 |
| L* | | — | — | 70 | — | — | 75 | — | — | 77.2 |
| a* | | — | — | -4.5 | — | — | -4.5 | — | — | -4.4 |
| b* | | — | — | -3.9 | — | — | -3.8 | — | — | -2.4 |

TABLE 13B

| Ingredient | Unit | E85 | E86 | C98 | E87 | E88 | C99 | E89 | E90 | C100 |
|---|---|---|---|---|---|---|---|---|---|---|
| $PAEBPA_{low}$ | g | | 32.5 | 64.6 | | 30 | 59.6 | | 27.5 | 54.6 |
| $PAEBPA_{high}$ | g | 65 | 32.5 | | 60 | 30 | | 55 | 27.5 | |
| PC-Si-1 | g | 10 | 10 | 10 | 15 | 15 | 15 | 20 | 20 | 20 |
| NB-GF | g | 20 | 20 | 20 | 20 | 20 | 20 | 20 | 20 | 20 |
| $TiO_2$ | g | 5 | 5 | 5 | 5 | 5 | 5 | 5 | 5 | 5 |
| PETS | g | 0.27 | 0.27 | 0.27 | 0.27 | 0.27 | 0.27 | 0.27 | 0.27 | 0.27 |
| ADR 4368 | g | 0.1 | 0.1 | 0.1 | 0.1 | 0.1 | 0.1 | 0.1 | 0.1 | 0.1 |
| Phosphites | g | 0.06 | 0.06 | 0.06 | 0.06 | 0.06 | 0.06 | 0.06 | 0.06 | 0.06 |
| $PAEBPA_{low}$/$PAEBPA_{high}$ | | 0 | 1 | NA | 0 | 1 | NA | 0 | 1 | NA |
| MFR 6 min. | g/10 min | 4 | 7.92 | 21.2 | 3.51 | 6.13 | 17.8 | 3.1 | 5.63 | 14 |
| Flex. Mod. | MPa | 4830 | 4710 | 4550 | 4710 | 4790 | 4580 | 4610 | 4580 | 4530 |
| NII | J/m | 271 | 170 | 123 | 299 | 237 | 139 | 313 | 232 | 154 |
| Ductility | % | 100 | 100 | 0 | 100 | 100 | 0 | 100 | 100 | 0 |

TABLE 13B-continued

| Ingredient | Unit | E85 | E86 | C98 | E87 | E88 | C99 | E89 | E90 | C100 |
|---|---|---|---|---|---|---|---|---|---|---|
| L* | | 95 | 95.3 | — | 94.6 | 95.3 | — | 94.3 | 95.1 | — |
| a* | | −0.4 | −0.4 | — | −0.5 | −0.5 | — | −0.6 | −0.5 | — |
| b* | | 2.6 | 3 | — | 2.1 | 2.4 | — | 1.9 | 2.4 | — |

TABLE 13C

| Ingredient | Unit | E91 | E92 | C101 | E93 | E94 | C102 | E95 | E96 | C103 |
|---|---|---|---|---|---|---|---|---|---|---|
| PAEBPA$_{low}$ | g | | 29 | 58 | | 26.5 | 53 | | 24 | 48 |
| PAEBPA$_{high}$ | g | 58 | 29 | | 53 | 26.5 | | 48 | 24 | |
| PC-Si-1 | g | 10 | 10 | 10 | 15 | 15 | 15 | 20 | 20 | 20 |
| NB-GF | g | 20 | 20 | 20 | 20 | 20 | 20 | 20 | 20 | 20 |
| TiO$_2$ | g | 12 | 12 | 12 | 12 | 12 | 12 | 12 | 12 | 12 |
| PETS | g | 0.27 | 0.27 | 0.27 | 0.27 | 0.27 | 0.27 | 0.27 | 0.27 | 0.27 |
| ADR 4368 | g | 0.1 | 0.1 | 0.1 | 0.1 | 0.1 | 0.1 | 0.1 | 0.1 | 0.1 |
| Phosphites | g | 0.06 | 0.06 | 0.06 | 0.06 | 0.06 | 0.06 | 0.06 | 0.06 | 0.06 |
| PAEBPA$_{low}$/PAEBPA$_{high}$ | | 0 | 1 | NA | 0 | 1 | NA | 0 | 1 | NA |
| MFR 6 min. | g/10 min | 4.35 | 7.65 | 19.5 | 4.17 | 6.64 | 14.8 | 3.79 | 5.75 | 11.6 |
| Flex. Mod. | MPa | 4880 | 5020 | 5010 | 4680 | 4760 | 4910 | 4670 | 4810 | 4840 |
| NII | J/m | 210 | 182 | 102 | 253 | 210 | 120 | 278 | 224 | 151 |
| Ductility | % | 100 | 100 | 0 | 100 | 100 | 0 | 100 | 100 | 0 |
| L* | | 95.4 | 96.4 | 97 | 95.1 | 96 | 96 | 94.9 | 96 | 96.1 |
| a* | | −0.5 | −0.5 | −0.5 | −0.5 | −0.5 | −0.4 | −0.6 | −0.5 | −0.5 |
| b* | | 1.7 | 2.1 | 2.3 | 1.6 | 1.9 | 2.6 | 1.3 | 1.8 | 1.9 |

As the amount of PC-Si increased, the impact strength increased, and this effect was constant as the TiO$_2$ loading increased. A high NII and ductility could also be maintained at 12 wt % TiO$_2$. It is believed that the TiO$_2$ may have shortened the length of the glass fibers during the compounding process, by milling the fibers. As a consequence, flexural modulus generally decreased with TiO$_2$ content. But at high loadings of TiO$_2$, the flexural modulus was compensated for by the presence of the TiO$_2$. Uniquely, as the TiO$_2$ loading increased, the impact strength was generally maintained in the formulations, while this is not the case in other polycarbonate compositions with glass fibers.

Examples E110-E114

Comparative Examples C110-C120 and Examples E110-E114 are described in Table 14A and Table 14B below. They contained 30% non-bonding glass fibers and varied in the BAEBPA$_{low}$/BAEBPA$_{high}$ ratio and the amount of PC-Si polymers.

TABLE 14A

| Ingredient | Unit | C110 | C111 | C112 | C113 | C114 | C115 | C116 | C117 |
|---|---|---|---|---|---|---|---|---|---|
| PAEBPA$_{low}$ | g | | 30 | 60 | | 55 | | 25 | 50 |
| PAEBPA$_{high}$ | g | 60 | 30 | | 55 | | 50 | 25 | |
| PC-Si-1 | g | 10 | 10 | 10 | 15 | 15 | 20 | 20 | 20 |
| NB-GF | g | 30 | 30 | 30 | 30 | 30 | 30 | 30 | 30 |
| TiO2 | g | | | | | | | | |
| PAEBPA$_{low}$/PAEBPA$_{high}$ | | 0 | 1 | NA | 0 | NA | 0 | 1 | NA |
| MFR 6 min. | g/10 min | 2.8 | 7.17 | 14.7 | 2.35 | 11.3 | 2.62 | 5.13 | 10.5 |
| Flex. Mod. | MPa | 6450 | 6480 | 6660 | 6150 | 6440 | 5900 | 6130 | 6310 |
| NII | J/m | 111 | 117 | 91.8 | 134 | 107 | 157 | 129 | 115 |
| Ductility | % | 80 | 60 | 0 | 100 | 0 | 100 | 80 | 20 |
| L* | | 72.4 | 68.9 | 65.9 | 75.9 | 74.2 | 79 | 76.9 | 77.2 |
| a* | | −3.2 | −4 | −3.3 | −3.4 | −4.7 | −3.7 | −4.2 | −4.6 |
| b* | | 1.9 | −0.2 | −1.4 | 1.1 | −0.5 | 1.3 | 0.3 | 0.1 |

TABLE 14B

| Ingredient | Unit | E110 | E111 | C118 | E112 | C119 | E113 | E114 | C120 |
|---|---|---|---|---|---|---|---|---|---|
| PAEBPA$_{low}$ | g | | 24 | 48 | | 43 | | 19 | 38 |
| PAEBPA$_{high}$ | g | 48 | 24 | | 43 | | 38 | 19 | |
| PC-Si-1 | g | 10 | 10 | 10 | 15 | 15 | 20 | 20 | 20 |
| NB-GF | g | 30 | 30 | 30 | 30 | 30 | 30 | 30 | 30 |
| TiO$_2$ | g | 12 | 12 | 12 | 12 | 12 | 12 | 12 | 12 |
| PAEBPA$_{low}$/PAEBPA$_{high}$ | | 0 | 1 | NA | 0 | NA | 0 | 1 | NA |
| MFR 6 min. | g/10 min | 4.98 | 6.78 | 16.9 | 3.65 | 11.9 | 3.5 | 4.64 | 9.46 |
| Flex. Mod. | MPa | 6290 | 6340 | 6490 | 6070 | 6240 | 5790 | 5970 | 6050 |

TABLE 14B-continued

| Ingredient | Unit | E110 | E111 | C118 | E112 | C119 | E113 | E114 | C120 |
|---|---|---|---|---|---|---|---|---|---|
| NII | J/m | 95.9 | 106 | 68.2 | 174 | 93.1 | 199 | 169 | 104 |
| Ductility | % | 0 | 0 | 0 | 40 | 0 | 100 | 20 | 0 |
| L* | | 93.1 | 93.3 | 95 | 93 | 93.8 | 92.7 | 93.1 | 93.2 |
| a* | | −0.5 | −0.5 | −0.5 | −0.5 | −0.5 | −0.5 | −0.5 | −0.5 |
| b* | | 1.4 | 1.4 | 2.4 | 1.6 | 1.5 | 1.4 | 1.6 | 1.3 |

Again, as the PC-Si content increased, the impact strength increased. Good impact strength and ductility could be maintained at a 30% loading (see E113), and the whiteness (L*) remained above 90.

Examples C120-C123

Four Comparative Examples C120-C123 were made containing 30% bonding glass fibers. Different polymers were used to determine their effect. The compositions are described in Table 15 below.

TABLE 15

| Ingredient | Unit | C120 | C121 | C122 | C123 |
|---|---|---|---|---|---|
| PAEBPA$_{low}$ | g | 18 | | | |
| PAEBPA$_{high}$ | g | 41 | 59 | 50 | |
| PC$_{low}$ | g | | | | 40 |
| PC$_{high}$ | g | | | | 19 |
| PC-Si-1 | g | 11 | 11 | 20 | 11 |
| G931F | g | 30 | 30 | 30 | 30 |
| CB | g | 0.3 | 0.3 | 0.3 | 0.3 |
| PETS | g | 0.3 | 0.3 | 0.3 | 0.3 |
| Phosphites | g | 0.03 | 0.03 | 0.03 | 0.03 |
| PAEBPA$_{low}$/PAEBPA$_{high}$ | | 0.4 | 0 | 0 | 2.1 |
| MFR 6 min. | g/10 min | 7.75 | 5.62 | 4.38 | 6.4 |
| Flex. Mod. | MPa | 7070 | 6500 | 6440 | 6320 |
| NII | J/m | 202 | 217 | 218 | 180 |
| Ductility | % | 0 | 0 | 0 | 0 |

Comparing Table 15 to Table 14A, bonding glass fibers gave a better flexural modulus and a greater MFR compared to non-bonding glass fibers. However, bonding glass fibers all had brittle failure (i.e., 0% ductility). Even large amounts of the PC-Si did not increase the NII or the ductility (C121 vs. C122) for bonding glass fibers. In other words, the addition of PC-Si did not improve impact as would have been expected.

Examples C125-C135

Eleven Comparative Examples were made as described in Table 16A and Table 16B below. These used 30% glass fibers and varied in the type of glass fiber and the type of polysiloxane-polycarbonate polymer.

TABLE 16A

| Ingredient | Unit | C125 | C126 | C127 | C128 | C129 | C130 |
|---|---|---|---|---|---|---|---|
| PAEBPA$_{high}$ | g | | | | | | |
| PC$_{low}$ | g | 40 | 40 | 14 | 14 | 40 | 40 |
| PC$_{high}$ | g | 19 | 19 | 6 | 6 | 19 | 19 |
| PC-Si-1 | g | 11 | 11 | | | 11 | 11 |
| PC-Si-2 | g | | | 50 | 50 | | |
| NB-GF | g | 30 | 30 | 30 | 30 | | |
| TSE-GF | g | | | | | 30 | 30 |
| CB | g | | 0.3 | | 0.3 | 0.3 | |
| TiO$_2$ | g | 5 | | 5 | | | 5 |
| PETS | g | 0.3 | 0.3 | 0.3 | 0.3 | 0.3 | 0.3 |
| Phosphites | g | 0.03 | 0.03 | 0.03 | 0.03 | 0.03 | 0.03 |
| MFR 6 min. | g/10 min | 4.93 | 4.71 | 6.65 | 8.81 | 6.3 | 5.55 |
| Flex. Mod. | MPa | 5720 | 6580 | 5920 | 6620 | 6240 | 5800 |
| NII | J/m | 210 | 212 | 159 | 169 | 187 | 120 |
| Ductility | % | 100 | 100 | 0 | 0 | 0 | 0 |
| L* | | — | 30.2 | 92.2 | 29.6 | — | — |
| a* | | — | 0 | 0.1 | −0.1 | — | — |
| b* | | — | −0.9 | −4 | −0.7 | — | — |

TABLE 16B

| Ingredient | Unit | C131 | C132 | C133 | C134 | C135 |
|---|---|---|---|---|---|---|
| PAEBPA$_{high}$ | g | | | | | 50 |
| PC$_{low}$ | g | 40 | 40 | 40 | 40 | |
| PC$_{high}$ | g | 19 | 19 | 19 | 19 | |
| PC-Si-1 | g | 11 | 11 | 11 | 11 | 20 |
| NB-GF | g | 10 | | | | |
| Bond-GF | g | | | 30 | 30 | |
| G931F | g | | | | | 30 |
| TSE-GF | g | 20 | | | | |
| FiberG | g | | 30 | | | |
| CB | g | 0.3 | 0.3 | 0.3 | | 0.3 |
| TiO$_2$ | g | | | | 5 | |
| PETS | g | 0.3 | 0.3 | 0.3 | 0.3 | 0.3 |
| Phosphites | g | 0.03 | 0.03 | 0.03 | 0.03 | 0.03 |
| MFR 6 min. | g/10 min | 6.39 | 8.39 | 8.07 | 7.52 | 4.38 |
| Flex. Mod. | MPa | 6870 | 6520 | 6430 | 5720 | 6440 |
| NII | J/m | 176 | 126 | 132 | 78.7 | 218 |
| Ductility | % | 0 | 0 | 0 | 0 | 0 |

Only compositions using non-bonding glass fibers had 100% ductility (C125/C126). No significant difference in NII was seen between using TiO$_2$ or using carbon black. Using PC-Si-2 instead of PC-Si-1 (with differing softblock content) did not improve the impact strength. In the compositions using bonding glass fibers (C129/C130 and C133/C134), using TiO$_2$ resulted in lower NII, however no such difference was found in the compositions using non-bonding glass fibers.

Examples C140-C146

Comparative Examples C140-C146 are described in Table 17 below. They contained 20% non-bonding glass fibers and varied in the type of resin.

TABLE 17

| Ingredient | Unit | C140 | C141 | C142 | C143 | C144 | C145 | C146 |
|---|---|---|---|---|---|---|---|---|
| PAEBPA$_{low}$ | g | 59.27 | 24 | | | 24 | | |
| PAEBPA$_{high}$ | g | 5 | 20 | | | 20 | | |
| PC$_{high}$ | g | | | 44 | 44 | | 40 | 20 |
| PCCD | g | | 20 | 20 | | | 20 | 40 |
| PBT 315 | g | | | | 20 | 20 | | |
| PC-Si-1 | g | 15 | 15 | 15 | 15 | 15 | 15 | 15 |
| NB-GF | g | 20 | 20 | 20 | 20 | 20 | 20 | 20 |
| TiO$_2$ | g | | | | | | 5 | 5 |
| PETS | g | 0.27 | 0.27 | 0.27 | 0.27 | 0.27 | 0.27 | 0.27 |
| ADR 4368 | g | 0.1 | 0.1 | 0.1 | 0.1 | 0.1 | 0.1 | 0.1 |
| Phosphites | g | 0.06 | 0.06 | 0.06 | 0.06 | 0.06 | 0.06 | 0.06 |
| PEPQ | g | | 0.15 | 0.15 | 0.15 | 0.15 | 0.15 | 0.15 |
| PA | g | | 0.05 | 0.05 | 0.05 | 0.05 | 0.05 | 0.05 |
| PAEBPA$_{low}$/PAEBPA$_{high}$ | | 11.9 | 1.2 | | | 1.2 | | |
| MVR | cc/10 min | 9.96 | 7.99 | 10.2 | 16.3 | 15.9 | 10.3 | 8.48 |
| NII | J/m | 194 | 215 | 179 | 140 | 150 | 137 | 110 |
| Ductility | % | 100 | 100 | 100 | 0 | 100 | 0 | 100 |
| Gloss | | | 83.5 | 84.56 | 83.46 | 55.92 | 34.58 | 83.44 | 29.28 |

Referring to C142/C145, PCCD with PC-Si and polycarbonate gave good NII and ductility, but performed poorly when TiO$_2$ was added. Both NII and ductility dropped. C146 had good ductility, but poor NII and very low gloss. Referring to C143/C144, these compositions had good MVR, but poor NII and gloss, indicating PBT had little benefit on improving surface aesthetics, even though it had superior flow to polycarbonate.

Based on these Comparative Examples, the combination of PAEBPA, PC-Si, and non-bonding glass fibers with TiO$_2$ gives the best balance of properties for impact strength, ductility, and whiteness.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A composition comprising:
   20 to 75 wt % of a first poly(aliphatic ester)-polycarbonate copolymer having a weight average molecular weight of from about 30,000 to about 40,000 measured by GPC based on bisphenol A polycarbonate standards;
   a second poly(aliphatic ester)-polycarbonate copolymer having a weight average molecular weight that is less than the weight average molecular weight of the first poly(aliphatic ester)-polycarbonate copolymer, wherein a weight ratio of the second poly(aliphatic ester)-polycarbonate copolymer to the first poly(aliphatic ester)-polycarbonate copolymer is from about 1:4 to about 5:2;
   5 to 25 wt % of a polysiloxane-polycarbonate copolymer;
   5 to 35 wt % of non-bonding glass fibers; and
   greater than 0 to 15 wt % of titanium dioxide;
   wherein the composition exhibits a notched Izod impact strength measured according to ASTM D256 of at least 90 J/m; a ductility measured according to ASTM D256 of at least 20%; and a L* measured according to CIELAB of at least 90.

2. The composition of claim 1, wherein the aliphatic ester is derived from an aliphatic dicarboxylic acid that has a total of from 8 to 12 carbon atoms.

3. The composition of claim 1, wherein an ester repeat unit of the first poly(aliphatic ester)-polycarbonate copolymer is derived from sebacic acid.

4. The composition of claim 1, wherein the second poly(aliphatic ester)-polycarbonate copolymer has a weight average molecular weight of from about 15,000 to about 25,000 measured by GPC based on bisphenol A polycarbonate standards.

5. The composition of claim 1, comprising from about 20 to about 40 wt % of the first poly(aliphatic ester)-polycarbonate copolymer.

6. The composition of claim 1, comprising from about 15 to about 55 wt % of the second poly(aliphatic ester)-polycarbonate copolymer.

7. The composition of claim 1, wherein the titanium dioxide is coated with an inorganic or organic coating.

8. The composition of claim 1, wherein the titanium dioxide has an average particle size of from about 30 nm to about 500 nm.

9. The composition of claim 1, wherein the composition exhibits a L* measured according to CIELAB of at least 95.

10. The composition of claim 1, wherein the composition exhibits a gloss measured according to ASTM D2457 (at 60°) of at least 40.

11. The composition of claim 1, wherein the composition exhibits a gloss measured according to ASTM D2457 (at 60°) of at least 80.

12. The composition of claim 1, wherein the composition exhibits a melt flow rate measured according to ASTM D 1238 (300° C., 1.2 kg, 6 minutes) of at least 3 g/10 min; and a flexural modulus measured according to ISO 178 of at least 3000 MPa.

13. The composition of claim 1, wherein the composition exhibits a notched Izod impact strength measured according to ASTM D256 of at least 150 J/m.

14. The composition of claim 1, wherein the composition exhibits a notched Izod impact strength measured according to ASTM D256 of from at least 200 J/m to about 350 J/m.

15. The composition of claim 1, wherein the composition exhibits a flexural modulus measured according to ISO 178 of from at least 3000 MPa to about 6000 MPa.

16. The composition of claim 1, wherein the composition contains at least 10 wt % of titanium dioxide; exhibits a notched Izod impact strength measured according to ASTM D256 of at least 200 J/m; and exhibits a L* measured according to CIELAB of at least 95.

17. The composition of claim 1, wherein the composition exhibits a ductility measured according to ASTM D256 of at least 80%.

18. The composition of claim 1, wherein the composition contains from about 5 to about 15 wt % of titanium dioxide and exhibits a ductility measured according to ASTM D256 of at least 80%.

19. The composition of claim 1, wherein the composition exhibits a ductility measured according to ASTM D256 of 100%.

20. The composition of claim 1, wherein the composition exhibits a ductility measured according to ASTM D256 of 100%.

21. The composition of claim 20, wherein the composition exhibits a gloss measured according to ASTM D2457 (at 60°) of at least 40.

22. The composition of claim 20, wherein the composition exhibits a gloss measured according to ASTM D2457 (at 60°) of at least 80.

23. The composition of claim 1, wherein the first poly(aliphatic ester)-polycarbonate copolymer contains from about 2 to about 13 mol % of aliphatic ester units.

24. The composition of claim 23, wherein the first poly(aliphatic ester)-polycarbonate copolymer contains from about 87 to about 98 mol % of carbonate units derived from bisphenol-A.

25. The composition of claim 23, wherein the aliphatic ester units are derived from sebacic acid.

26. The composition of claim 1, wherein a siloxane block chain length of the polysiloxane-polycarbonate copolymer is from about 30 to about 100.

27. The composition of claim 1, wherein a siloxane block chain length of the polysiloxane-polycarbonate copolymer is from about 35 to about 55.

28. The composition of claim 1, wherein the polysiloxane-polycarbonate copolymer has a siloxane block content of from about 15 wt % to about 25 wt %.

29. The composition of claim 1, wherein the polysiloxane-polycarbonate copolymer has a siloxane block content of from greater than 6 wt % to about 22 wt %.

30. The composition of claim 1, wherein the composition comprises from about 0.5 wt % to about 6 wt % of siloxane originating from the polysiloxane-polycarbonate copolymer.

31. The composition of claim 1, wherein the composition has a total softblock content of less than 3.5 wt %.

32. The composition of claim 1, wherein the composition does not contain zinc sulfide or calcium carbonate.

33. The composition of claim 1, wherein the composition does not contain milled fibers, bonding glass fibers, or flat glass fibers.

34. The composition of claim 1, wherein the composition has an a* value measured according to CIELAB of from −1 to zero.

35. The composition of claim 1, wherein the composition has a b* value measured according to CIELAB of from 1 to 3.

36. The composition of claim 1, wherein the composition exhibits a notched Izod impact strength measured according to ASTM D256 of from 150 J/m to about 300 J/m.

37. An article made from the composition of claim 1 that has a wall with a thickness of at least 0.3 mm and less than 1 mm.

38. The article of claim 37, wherein the article is a part of a cellphone, a MP3 player, a computer, a laptop, a camera, a video recorder, an electronic tablet, a hand receiver, a kitchen appliance, or an electrical housing.

39. A composition comprising, based on the total weight of the composition:
  20 to 40 wt. % of a first poly(aliphatic ester)-polycarbonate copolymer having a weight average molecular weight of from about 30,000 to about 40,000 measured by GPC based on bisphenol A polycarbonate standards;
  15 to 55 wt % of a second poly(aliphatic ester)-polycarbonate copolymer having a weight average molecular weight of from 15,000 to 25,000 measured by GPC based on bisphenol A polycarbonate standards,
  5 to 25 wt. % of a polysiloxane-polycarbonate copolymer;
  5 to 35 wt. % of non-bonding glass fibers; and
  greater than 0 to 15 wt. % of titanium dioxide;
  wherein
  the composition exhibits a notched Izod impact strength measured according to ASTM D256 of at least 90 J/m; a ductility measured according to ASTM D256 of at least 20% ; and a L* measured according to CIELAB of at least 90.

40. The composition of claim 39, wherein the non-bonding glass fiber is present in an amount of 10 to 20 wt. % based on the total weight of the composition.

* * * * *